US011556501B2

(12) United States Patent
Pogde et al.

(10) Patent No.: US 11,556,501 B2
(45) Date of Patent: Jan. 17, 2023

(54) DETERMINING DIFFERENCES BETWEEN TWO VERSIONS OF A FILE DIRECTORY TREE STRUCTURE

(71) Applicant: Cohesity, Inc., San Jose, CA (US)

(72) Inventors: Prashant Pogde, Sunnyvale, CA (US); Apurv Gupta, Bangalore (IN); Zheng Cai, Cupertino, CA (US); Sureshbabu Murugesan, Union City, CA (US); Markose Thomas, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 170 days.

(21) Appl. No.: 16/818,547

(22) Filed: Mar. 13, 2020

(65) Prior Publication Data

US 2020/0301882 A1    Sep. 24, 2020

Related U.S. Application Data

(60) Provisional application No. 62/821,261, filed on Mar. 20, 2019.

(51) Int. Cl.
| | |
|---|---|
| *G06F 16/11* | (2019.01) |
| *G06F 11/14* | (2006.01) |
| *G06F 16/22* | (2019.01) |
| *G06F 16/18* | (2019.01) |
| *G06F 16/27* | (2019.01) |

(52) U.S. Cl.
CPC ........ *G06F 16/128* (2019.01); *G06F 11/1451* (2013.01); *G06F 11/1464* (2013.01); *G06F 16/2246* (2019.01); *G06F 16/1858* (2019.01); *G06F 16/278* (2019.01)

(58) Field of Classification Search
CPC ............... G06F 16/128; G06F 16/2246; G06F 11/1451; G06F 11/1464
See application file for complete search history.

(56) References Cited

U.S. PATENT DOCUMENTS

| | | | |
|---|---|---|---|
| 8,965,941 B2* | 2/2015 | Nishida ............... | G06F 16/1734 |
| | | | 707/830 |
| 10,133,508 B1* | 11/2018 | Smaldone ............... | G06F 11/14 |
| 2002/0112022 A1* | 8/2002 | Kazar .................. | G06F 16/1824 |
| | | | 707/999.001 |

(Continued)

OTHER PUBLICATIONS

Weeden et al., "Parallelization: Binary Tree Traversal", Shodor Education Foundation, Inc., Aug. 2012, pp. 1-18.

*Primary Examiner* — Ashish Thomas
*Assistant Examiner* — Jedidiah P Ferrer
(74) *Attorney, Agent, or Firm* — Van Pelt, Yi & James LLP

(57) ABSTRACT

A file directory tree structure of a selected storage snapshot is dynamically divided into different portions. A plurality of the different file directory tree structure portions are analyzed in parallel to identify any changes of the selected storage snapshot from a previous storage snapshot. To analyze each of the plurality of the different file directory tree structure portions, a processor is further configured to traverse and compare a corresponding file directory tree structure portion of the selected storage snapshot with a corresponding portion of a file directory tree structure of the previous storage snapshot while at least another one of the plurality of the different file directory tree structure portions of the selected storage snapshot is being analyzed in parallel.

17 Claims, 15 Drawing Sheets

(56) References Cited

U.S. PATENT DOCUMENTS

| | | | |
|---|---|---|---|
| 2011/0040810 A1* | 2/2011 | Kaplan | G06F 16/17 |
| | | | 707/822 |
| 2012/0310890 A1* | 12/2012 | Dodd | G06F 16/113 |
| | | | 707/646 |
| 2016/0202927 A1* | 7/2016 | Klarakis | G06F 11/1453 |
| | | | 709/217 |
| 2017/0109243 A1* | 4/2017 | Kumar | G06F 11/14 |
| 2019/0163542 A1* | 5/2019 | Masaki | G06F 16/9027 |

* cited by examiner

DETERMINING DIFFERENCES BETWEEN TWO VERSIONS OF A FILE DIRECTORY TREE STRUCTURE

CROSS REFERENCE TO OTHER APPLICATIONS

This application claims priority to U.S. Provisional Patent Application No. 62/821,261 entitled DETERMINING DIFFERENCES BETWEEN TWO VERSIONS OF A FILE DIRECTORY TREE STRUCTURE filed on Mar. 20, 2019, which is incorporated herein by reference for all purposes.

BACKGROUND OF THE INVENTION

A primary system may store a plurality of files and use a file directory tree structure to organize the files. The file directory tree structure may be comprised of a root node, one or more levels of one or more intermediate nodes, and a plurality of leaf nodes. A node of the file directory tree structure may correspond to a directory, a sub-directory, or a file. For example, a root node of the file directory tree structure may correspond to the root directory "C:\," an intermediate node may correspond to the sub-directory "C:\Users," another intermediate node may correspond to the sub-directory "C:\Users\User1," and a leaf node may correspond to a file "test.txt." The file path for "test.txt" may be represented as "C:\Users\User1\test.txt."

A storage system may back up the file directory tree structure. The primary system may keep track of the changes to the file directory tree structure, but not provide the storage system with access to the tracked changes. The backup of the file directory tree structure may be a full backup or an incremental backup. An incremental backup may be comprised of the data associated with the file directory tree structure that was not backed up. To perform an incremental backup, systems may use a single directory walker to traverse the entire last backed up version of the file directory tree structure and a single directory walker to traverse the entire version of the file directory tree structure that was not backed up to determine the data associated with the file directory tree structure that was not previously backed up. However, a file directory tree structure may be comprised of a large number of nodes (e.g., millions). It may take a long period of time (days) to traverse the two file directory tree structures and to determine the differences between them.

BRIEF DESCRIPTION OF THE DRAWINGS

Various embodiments of the invention are disclosed in the following detailed description and the accompanying drawings.

DETAILED DESCRIPTION

Figure 1:
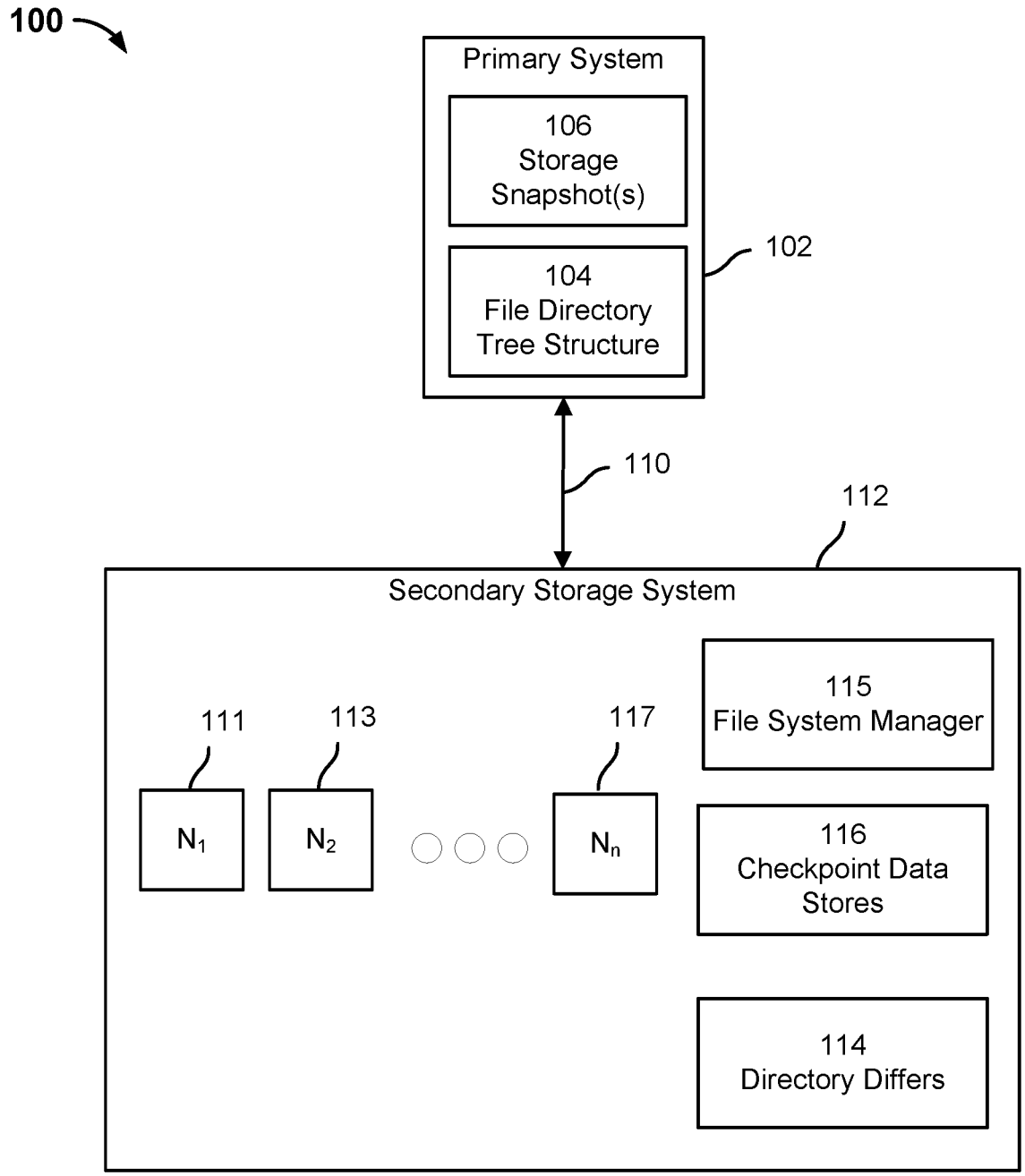
FIG. 1 is a block diagram illustrating a system for performing a backup of a file directory tree structure in accordance with some embodiments.

A primary system may perform a backup of its file directory tree structure and store the data associated with the file directory tree structure in a storage snapshot. The storage snapshot may represent a state of the file directory tree structure at a particular moment in time. The primary system may be configured to back up to a storage system the file directory tree structure. The storage system may receive data associated with the file directory tree structure and generate a copy of the file directory tree structure.

At a first moment in time, the primary system may perform a full backup of the file directory tree structure and send to the storage system data associated with the entire file directory tree structure. In response to receiving the data associated with the file directory tree structure, the storage system may generate a file directory tree structure. The amount of time needed to traverse and determine the data associated with the file directory tree structure may be reduced by using in parallel, a plurality of directory differs and a plurality of directory walkers. The file directory tree structure may be associated with a primary directory differ. For a full backup, the primary directory differ may be configured to orchestrate a traversal of a version of a file directory tree structure. The primary directory differ may initially divide the file directory tree structure into a plurality of portions and assign a corresponding directory differ to each of the plurality of portions and dynamically divide the file directory tree structure into a plurality of portions after traversal of the file directory tree structure has commenced. The file directory tree structure may be dynamically divided after traversal of the file directory tree structure has commenced based on one or more factors (e.g., amount of resources available, the actual time needed to traverse a portion of a file directory tree structure is taking more time than an expected amount of time needed to traverse the portion of the file directory tree structure, one of the directory differs and associated directory walkers have finished traversing their corresponding portion of the file directory tree structure, etc.). The file directory tree structure may be dynamically divided any time after traversal of the file directory tree structure has commenced and before the entire file directory tree structure has been traversed. A directory differ may further subdivide an assigned portion of the file directory tree structure into a plurality of sub-portions prior to traversing the assigned portion. In some embodiments, the directory differ assigned to a portion of the file directory tree structure may orchestrate a traversal of the sub-portions using a plurality of corresponding directory differs.

In some embodiments, for a full backup, each corresponding directory differ is associated with two directory walkers. The corresponding directory differ may use only one of the directory walkers to traverse a portion of the version of the file directory tree structure. The output of the directory walker may be compared to a null tree. The difference between the output of the directory walker and the null tree may represent the nodes associated with the portion of the file directory tree structure traversed by the directory walker associated with a corresponding directory differ. In other embodiments, for a full backup, each directory differ is associated with a single directory walker.

A directory walker may be configured to traverse an assigned portion of the version of the file directory tree structure using a preorder traversal with lexicographical ordering of children nodes. Each directory walker may be associated with a directory tuple. The directory tuple may define the portion of a file directory tree structure that a directory walker is configured to traverse. The directory tuple may include information such as a root node, a starting node, and ending node, and may be represented as (root node, starting node, ending node). By configuring non-overlapping portions with the directory tuple, the directory differs orchestrate the directory walkers to avoid traversing a portion of the file directory tree structure assigned to a different directory walker. Configuring non-overlapping portions may prevent the directory walkers from reporting an inaccurate representation of the file directory tree structure. It is also an efficient use of resources to execute a single traversal of a node in a version of a file directory tree structure, when possible.

The plurality of directory differs and associated directory walkers may reduce the amount of time needed to traverse the version of the file data tree structure because instead of having a single directory walker to traverse the entire file directory tree structure, a plurality of directory walkers may be used in parallel to traverse the version of the file directory tree structure.

Each directory walker may be configured to report its traversal progress to an associated directory differ and each directory differ may be configured to generate a corresponding checkpoint data store based on the information received from an associated directory walker. In some embodiments, for a full backup, each corresponding directory differ is associated with two directory walkers. The corresponding directory differ may use only one of the directory walkers to traverse a portion of the version of the file directory tree structure. The output of the directory walker may be compared to a null tree. The difference between the output of the directory walker and the null tree may represent the nodes associated with the portion of the file directory tree structure traversed by the directory walker associated with a corresponding directory differ. In other embodiments, for a full backup, each directory differ is associated with a single directory walker. The nodes traversed by the single directory walker represent the nodes of a portion of the file directory tree structure. The corresponding checkpoint data store may store the one or more nodes traversed by a directory walker. The checkpoint data store associated with each of the directory differs may be merged into one or more consolidated checkpoint data stores.

In some embodiments, the checkpoint data stores are merged into a global checkpoint data store. The global checkpoint data store may include split information that indicates which nodes of the file directory tree structure were used to split the file directory tree structure into a plurality of portions. The split information may be used to divide a subsequent version of the file directory tree structure.

In other embodiments, the checkpoint data stores are merged into a plurality of consolidated checkpoint data stores where the number of the plurality of consolidated checkpoint data stores is less than the number of checkpoint data stores associated with each of the directory differs. During a traversal of a file directory tree structure, one of the file directory tree structure portions may be further subdivided into a plurality of portions. As a result, the plurality of portions of the file directory tree structure may be unbalanced because they do not include approximately the same number of nodes. The primary directory differ may use the plurality of consolidated checkpoint data stores to plan for the next traversal. For example, a primary directory differ may generate new portions for use in a subsequent traversal, according to the number of nodes. For example, a directory differ may attempt to balance the portions of the file directory tree structure such that each portion includes approximately the same number of nodes (e.g., each portion having a number of nodes within a range of number of nodes). The consolidated checkpoint data stores may be updated according to the balanced portions. One of the consolidated checkpoint data stores may correspond to one of the balanced portions.

The one or more consolidated checkpoint data stores may be used in a subsequent traversal of a subsequent version of the file directory tree structure. For example, a subsequent version of the file directory may be divided using the split information included in the global checkpoint data store. In other embodiments, the subsequent version of the file directory tree structure is divided based on the plurality of checkpoint data stores. Using the one or more consolidated checkpoint data stores may reduce the amount of time to configure a traversal of the subsequent version of the file directory tree structure because the plurality of portions of the subsequent version of the file directory tree structure are already established.

At a second moment in time, the primary system may be configured to perform a subsequent snapshot of the file directory tree structure. An incremental backup of the file directory tree structure may be performed based on the subsequent snapshot of the file directory tree structure. An incremental backup may be comprised of the data associated with the file directory tree structure that was not previously backed up. In response to receiving the data associated with the file directory tree structure that was not previously backed up, the storage system may generate an updated file directory tree structure. The primary system may perform one or more subsequent backups (full or incremental) of the file directory tree structure, send to the secondary storage system, the data associated with the one or more subsequent backups, and in response to receiving the data associated with the one or more subsequent backups, the storage system may be configured to generate one or more updated file directory tree structures.

The amount of time needed to traverse and determine the data associated with the file directory tree structure that was not previously backed up may be reduced by using the one or more consolidated checkpoint data stores to avoid a full traversal of the first version of the file directory tree structure. The primary directory differ may be configured to orchestrate a traversal of a second version of the file directory tree structure using the one or more consolidated checkpoint data stores to determine one or more differences between the first and second versions of the file directory tree structure. The one or more differences may correspond to data associated with the file directory tree structure that was not previously backed up. The one or more consolidated checkpoint data stores may correspond to the plurality of portions associated with the first version of the file directory tree structure. The primary directory differ may assign a corresponding directory differ to each of the plurality of corresponding portions of the second version of the file directory tree structure. Each directory differ is associated with a directory walker. The directory walker may be configured to traverse an assigned portion of the second version of the file directory tree structure and provide traversal data to an associated directory differ. The directory differ may receive traversal data from a directory walker (associated with the second version of the file directory tree structure) and compare the traversal data to a corresponding consolidated checkpoint data store to determine one or more differences between the first and second versions of the file directory tree structures. The plurality of directory differs and associated directory walkers may reduce the amount of time needed to determine the one or more differences between the first and second versions of the file directory tree structures because instead of having a single directory walker to traverse a first file directory tree structure and a single directory walker to traverse a second file directory tree structure, a plurality of directory walkers may be used in parallel to traverse the second file directory tree structure; furthermore, the one or more consolidated checkpoint data stores include information from a traversal of the first file directory structure, so an additional traversal of the first file directory may not be required to determine the differences between the first and second versions of the file directory structures.

In some embodiments, the file directory tree structure has not changed more than a threshold amount between a first version of the file directory tree structure and a second version of the file directory tree structure. For example, the plurality of portions of the file directory tree structures include approximately the same number of nodes (e.g., a threshold number of nodes have not been either added or removed from a portion of a file directory tree structure). A plurality of directory differs may provide their corresponding checkpoint data stores to the primary directory differ. The primary directory differ may determine the differences between the two versions of the file directory tree structure based on the checkpoint data stores associated with the plurality of directory differs and determine the data associated with a file directory tree structure that has not been backed up. The storage system may request from the primary system the data associated with the file directory tree structure that has not been backed up and the primary system may then perform an incremental backup of its file directory tree structure by sending the requested data.

In other embodiments, the file directory tree structure has changed more than a threshold amount between a first version of the file directory tree structure and a second version of the file directory tree structure. For example, the plurality of portions of the file directory tree structures do not include approximately the same number of nodes (e.g., a threshold number of nodes have been either added or removed from a portion of a file directory tree structure). A directory differ may determine that a directory walker traversing the second version of the file directory tree structure is encountering a threshold number of new nodes or that a threshold number of nodes have been removed from a file directory tree structure between the first and second versions of the file directory tree structure. A directory differ that determines that its corresponding portion of the file directory tree structure has changed more than a threshold amount may provide to the primary directory differ a notification that the portion of the file directory tree structure assigned to the directory differ has changed more than a threshold amount. In response to receiving the notification, the primary directory differ may determine that the file directory tree structure needs to be re-divided because the portions of the file directory tree structure are unbalanced. One or more directory walkers may finish traversing their assigned portions before other directory walkers due to the portions of the file directory tree structure being unbalanced.

The second version of the file directory tree can be initially divided prior to being traversed and dynamically divided after traversal of the file directory tree structure has commenced. The primary directory differ may dynamically divide the second version of the file directory tree structure into a plurality of portions and assign a corresponding directory differ to each of the plurality of portions. The primary directory differ may perform a breadth first search associated with the level below the root node of the second version of the file directory tree structure to determine the plurality of nodes associated with the level and the number of nodes associated with the level. The file directory tree structure may be divided based on the number of nodes associated with the level. The number of nodes associated with the level may be n. The file directory tree structure may be divided into 2 to n portions where any of the nodes of the level may be used to divide the file directory tree structure. The corresponding directory tuples associated with the directory walkers are updated to reflect the divisions. This may prevent a directory walker from traversing a portion of the file directory tree structure that is assigned to a different directory walker. The file directory tree structure may be dynamically divided after traversal of the file directory tree structure has commenced based on one or more factors (e.g., amount of resources available, the actual time needed to traverse a portion of a file directory tree structure is taking more time than an expected amount of time needed to traverse the portion of the file directory tree structure, etc.). The file directory tree structure may be dynamically divided any time after traversal of the file directory tree structure has commenced and before the entire file directory tree structure has been traversed.

The primary directory differ may be configured to orchestrate a traversal of a first version of a file directory tree structure and a traversal of a second version of the file directory tree structure to determine one or more differences between the first and second versions of the file directory tree structure. The one or more differences may correspond to data associated with the file directory tree structure that was not previously backed up.

The primary directory differ may assign a corresponding directory differ to each of the plurality of portions. Each directory differ is associated with a first directory walker and a second directory walker. The first directory walker may be configured to traverse an assigned portion of the first version of the file directory tree structure and the second directory walker may be configured to traverse the assigned portion of the second version of the file directory tree structure.

The primary directory differ may dynamically divide the file directory tree structure after a portion of the first and second versions of the file directory tree structure have been traversed. A primary directory differ may select one of the active directory differs, stop a traversal of the file directory tree structure portion associated with the selected active directory differ, divide the portion associated with the selected directory differ into a plurality of sub-portions, assign a corresponding differ to the plurality of sub-portions, resume the traversal of the file directory tree structure portion associated with the selected active directory differ, and initiate a traversal of the new file directory tree sub-portions associated with the corresponding differs. For example, the primary directory differ may initially divide the file directory tree structures into five portions. The primary directory differ may select the active directory differ associated with the third portion after a traversal of the file directory tree structure has commenced. A traversal of the third portion may be paused while the third portion of the file directory tree structure is being divided into four sub-portions. The active directory differ associated with the third portion may be assigned to one of the four sub-portions and directory differs may be assigned to a corresponding sub-portion. A traversal of the four sub-portions may begin after the directory differs and associated directory walkers are assigned to their corresponding sub-portions.

The plurality of directory differs and associated directory walkers may reduce the amount of time needed to traverse the two versions of the file data tree structure because instead of having a single directory walker to traverse a first file directory tree structure and a single directory walker to traverse a second file directory tree structure, a plurality of directory walkers may be used in parallel to traverse the first file directory tree structure and a plurality of directory walkers may be used in parallel to traverse the second file directory tree structure.

The primary directory differ may determine the differences between the two versions of the file directory tree structure based on the checkpoint data stores associated with the plurality of directory differs and determine the data associated with a file directory tree structure that has not been backed up. The storage system may request from the primary system the data associated with the file directory tree structure that has not been backed up and the primary system may then perform an incremental backup of its file directory tree structure by sending the requested data.

FIG. 1 is a block diagram illustrating a system for performing a backup of a file directory tree structure in accordance with some embodiments. In the example shown, system 100 includes a primary system 102 and a storage system 112.

Primary system 102 is a computing system that is configured to store a plurality of files. Primary system 102 may be comprised of one or more servers, one or more computing devices, one or more storage devices, and/or a combination thereof. Primary system 102 may be configured to organize the plurality of files using file directory tree structure 104. File directory tree structure 104 may be comprised of a root node, one or more levels of one or more intermediate nodes, and a plurality of leaf nodes. A node of file directory tree structure 104 may correspond to a directory, a sub-directory, or a file. Primary system 102 may be configured to perform a snapshot of file directory tree structure 104 and store the data associated with file directory tree structure 104 in a storage snapshot. A storage snapshot may correspond to a state of file directory tree structure 104 at a particular moment in time. Primary system 102 may be configured to store one or more storage snapshots 106.

Primary system 102 may be configured to send data associated with one or more storage snapshots 106 to storage system 112 via network connection 110. Network connection 110 may be a wired or wireless connection. Storage system 112 may receive data associated with a storage snapshot and store the data associated with the storage snapshot across the storage nodes 111, 113, 117. Each storage node has a corresponding processor. File system manager 115 may be configured to recreate file directory tree structure 104 on storage system 112 based on the received data associated with file directory tree structure 104. In some embodiments, the data associated with a storage snapshot includes all of the data associated with a file directory tree structure. In other embodiments, the data associated with a storage snapshot includes data associated with a file directory tree structure that was not previously backed up to storage system 112.

Storage system 112 may remotely access the one or more storage snapshots. In some embodiments, storage system 112 uses a distributed file system protocol (e.g., network file system) to remotely access the one or more storage snapshots 106.

In some embodiments, storage system 112 remotely accesses the one or more storage snapshots 106 to determine the plurality of nodes associated with a version of file directory tree structure 104. For example, the plurality of nodes associated with a version of file directory tree structure 104 may be determined to perform a full backup of the file directory tree structure. Storage system 112 may request the plurality of nodes associated with the version of file directory tree structure 104 when primary system 102 is performing a full backup up file directory tree structure 104.

In other embodiments, storage system 112 remotely accesses the one or more storage snapshots 106 to determine one or more differences between a first version of file directory tree structure 104 and a second version of file directory tree structure 104. The one or more determined differences may correspond to the nodes of file directory tree structure that were not previously backed up. Storage system 112 may request the one or more nodes corresponding to the one or more determined differences when primary system 102 is performing an incremental backup of file directory tree structure 104.

Storage system 112 may include one or more directory differs 114 and use the one or more directory differs 114 to remotely access the one or more storage snapshots 106. The one or more directory differs 114 may include a primary directory differ and a plurality of secondary directory differs. The primary directory differ may be configured to orchestrate a traversal of a version of file directory tree structure 104 to perform a full backup of the version of file directory tree structure 104. The primary directory differ may be configured to orchestrate a traversal of a first version of file directory tree structure 104 and a second version of file directory tree structure 104 to determine the differences between the first and second versions of the file directory tree structure 104. In other embodiments, a main coordinator (not shown) is configured to orchestrate a traversal of one or more versions of file directory tree structure 104 using a plurality of directory differs and corresponding directory walkers.

For a full backup, the primary directory differ may be associated with a single corresponding directory walker. The single corresponding directory walker may be configured to traverse at least a portion of a version of file directory tree structure 104. In other embodiments, the primary directory differ is associated with a first corresponding directory walker and a second corresponding directory walker. The primary directory differ may use only one of the directory walkers to traverse a portion of the version of the file directory tree structure. The output of the directory walker may be compared to a null tree. The difference between the output of the directory walker and the null tree may represent the nodes associated with the portion of the file directory tree structure traversed by the directory walker associated with a primary directory differ.

For an incremental backup, the primary directory differ may be associated with a first corresponding directory walker and a second corresponding directory walker. The first corresponding directory walker may be configured to traverse at least a portion of a first version of file directory tree structure 104 and the second corresponding directory walker may be configured to traverse at least a portion of a second version of file directory tree structure 104.

For a full backup, a secondary directory differ may be associated with a single corresponding directory walker. The single corresponding directory walker may be configured to traverse at least a portion of a version of file directory tree structure 104. In some embodiments, the secondary directory differ is associated with a first corresponding directory walker and a second corresponding directory walker. The secondary directory differ may use only one of the directory walkers to traverse a portion of the version of the file directory tree structure. The output of the directory walker may be compared to a null tree. The difference between the output of the directory walker and the null tree may represent the nodes associated with the portion of the file directory tree structure traversed by the directory walker associated with a secondary directory differ. In some embodiments, for an incremental backup, a secondary directory differ may be associated with a single corresponding directory walker. The single corresponding directory walker may be configured to traverse at least a portion of a version of file directory tree structure 104. The traversal data associated with the single corresponding directory walker may be compared to a checkpoint data store. In some embodiments, for an incremental backup, a secondary directory differ may be associated with a first corresponding directory walker and a second corresponding directory walker. The first corresponding directory walker may be configured to traverse at least a portion of a first version of file directory tree structure 104 and the second corresponding directory walker may be configured to traverse at least the portion of a second version of file directory tree structure 104, that is, the first and second corresponding directory walkers are configured to traverse the same portion of file directory tree structure 104, but for different versions of file directory tree structure 104.

A directory walker is configured to traverse at least a portion of file directory tree structure 104 based in part on an associated directory tuple. A directory tuple may indicate at least a portion of file directory tree structure 104 that an associated directory walker is configured to traverse. The directory tuple may be expressed as: (root node, starting node, end node). In other embodiments, the directory tuple may be expressed as (root node, starting node, end node, depth level). The depth level information associated with a directory tuple indicates a number of levels of file directory tree structure 104 that a directory walker is configured to traverse. A directory walker may be configured to traverse an assigned portion of a file directory tree structure using a preorder traversal with lexicographical ordering of children nodes. The directory walkers associated with a directory differ may be associated with the same associated directory tuple.

Using a single primary directory differ and two directory walkers to determine the plurality of nodes associated with file directory tree structure 104 or to determine the one or more differences between a first and second version of file directory tree structure 104 may take too long to perform. The primary directory differ may be configured to divide a version of file directory tree structure 104 into n portions. The version of file directory tree structure 104 may be divided based on an expected length of time needed to traverse file directory tree structure 104. In other embodiments, file directory tree structure 104 is divided into n portions based on an amount of available resources. In other embodiments, file directory tree structure 104 is divided into n portions based on a number of nodes included in file directory tree structure 104. In other embodiments, file directory tree structure 104 is divided into n portions based on a storage size associated with a version of file directory tree structure 104.

In some embodiments, file directory tree structure 104 is divided prior to file directory tree structure 104 being traversed. To divide a version of file directory tree structure 104, the primary directory differ may determine a root node associated with the version of file directory tree structure 104, determine a level below the root node associated with the version of file directory tree structure 104, and perform a breadth first search associated with the level below the root node to determine the plurality of nodes associated with the level. The number of nodes associated with the level may be n. The file directory tree structure may be divided into 2 to n portions where any of the nodes of the level may be used to divide the file directory tree structure. For example, the file directory tree structure may be divided at each node of the level. For a level having four nodes, a first node of the level and its children nodes may be associated with a corresponding portion of the file directory tree structure, a second node of the level and its children nodes may be associated with a corresponding portion of the file directory tree structure, a third node of the level and its children nodes may be associated with a corresponding portion of the file directory tree structure, and a fourth node of the level and its children nodes may be associated with a corresponding portion of the file directory tree structure. In another example, the number of nodes associated with the level is even. A first portion of file directory tree structure 104 may be associated with the nodes included in a first half of the level and a second portion of file directory tree structure 104 may be associated with nodes included in a second half of the level.

The primary directory differ may further divide a portion of file directory tree structure 104. The primary directory differ may select a node included in the portion of file directory tree structure 104. The selected node may be associated with a plurality of children nodes. The primary directory differ may determine a level below the selected node, perform a breadth first search associated with the level below the selected node to determine a starting node associated with the level, an ending node associated with the level, and if there are any nodes between the starting node and the ending node. The primary directory differ may divide the portion of file directory tree structure 104 into sub-portions based on the nodes associated with the level. The portion of the file directory tree structure may be further divided at any of the nodes associated with the level. In other embodiments, a secondary directory differ may divide its own assigned portion of file directory tree structure 104 using the steps described herein. A secondary directory differ may further divide its own assigned portion of file directory tree structure 104 into a plurality of sub-portions prior to traversing the assigned portion. In some embodiments, the directory differ assigned to a portion of the file directory tree structure may orchestrate a traversal of the sub-portions using a plurality of corresponding directory differs.

In other embodiments, file directory tree structure 104 is dynamically divided after a portion of file directory tree structure 104 has been traversed. File directory tree structure 104 may be dynamically divided after traversal of file directory tree structure 104 has commenced based on one or more factors (e.g., amount of resources available, the actual time needed to traverse a portion of a file directory tree structure is taking more time than an expected amount of time needed to traverse the portion of the file directory tree structure, one of the directory differs and associated directory walkers have finished traversing their corresponding portion of the file directory tree structure 104, etc.). The file directory tree structure may be dynamically divided any time after traversal of the file directory tree structure has commenced and before the entire file directory tree structure has been traversed. Further sub-dividing a portion of file directory tree structure 104 and assigning corresponding directory differs and directory walkers to the sub-portions after traversal of file directory tree structure 104 has commenced may reduce the amount of time needed to traverse file directory tree structure 104.

For example, storage system 112 may finish one or more other processes and have additional computing resources available to traverse file directory tree structure 104. A primary directory differ or a main coordinator may determine to use the additional computing resources to further sub-divide a portion of file directory tree structure 104. The additional computing resources may be used for the additional directory differs and associated directory walkers. In response to determining additional computing resources exist, a primary directory differ or a main coordinator may select one of the active directory differs, stop a traversal of the file directory tree structure portion associated with the selected active directory differ, divide the portion associated with the selected directory differ into a plurality of sub-portions, resume the traversal of the file directory tree structure portion associated with the selected directory differ, and initiate a traversal of the new file directory tree sub-portions associated with the corresponding differs. In other embodiments, a secondary directory differ may be configured to divide its assigned portion of file directory tree structure 104 into a plurality of sub-portions.

In some embodiments, a primary directory differ or a main coordinator may determine that the actual time needed to traverse a portion of a file directory tree structure is taking more time than an expected amount of time needed to traverse the portion of the file directory tree structure. In response to determining that the actual time needed to traverse a portion of a file directory tree structure is taking more time than an expected amount of time needed to traverse the portion of the file directory tree structure, a primary directory differ or a main coordinator may select the active directory differ associated with the portion of the file directory tree structure that is taking longer than expected to traverse, stop a traversal of the file directory tree structure portion associated with the selected active directory differ, divide the remaining portion associated with the selected directory differ into a plurality of sub-portions, resume the traversal of the file directory tree structure portion associated with the selected directory differ, and initiate a traversal of the new file directory tree sub-portions associated with the corresponding differs. In other embodiments, a secondary directory differ may be configured to divide its assigned portion of file directory tree structure 104 into a plurality of sub-portions in the event the actual time needed by the directory walkers associated with the directory differ to traverse a portion of a file directory tree structure is taking more time than an expected amount of time needed to traverse the assigned portion of the file directory tree structure.

In other embodiments, a primary directory differ or a main coordinator may determine that one of the directory differs and associated directory walkers have finished traversing their corresponding portion of the file directory tree structure 104. The computing resources allocated for the finished directory differ and associated directory walkers may be reallocated to reduce the amount of time needed to traverse other portions of file directory tree structure 104. In response to determining that one of the directory differs and associated directory walkers have finished traversing their corresponding portion of the file directory tree structure 104, a primary directory differ or a main coordinator may select one of the active directory differs, stop a traversal of the file directory tree structure portion associated with the selected active directory differ, divide the portion associated with the selected directory differ into a plurality of sub-portions, resume the traversal of the file directory tree structure portion associated with the selected active directory differ, and initiate a traversal of the new file directory tree sub-portions associated with the corresponding differs. In other embodiments, a secondary directory differ may be configured to divide its assigned portion of file directory tree structure 104 into a plurality of sub-portions.

A portion of file directory tree structure 104 associated with a directory differ may be divided by determining a root node associated with a directory differ, determine a level below the root node associated with the directory differ, and perform a breadth first search associated with the level below the root node associated with the directory differ to determine a starting node associated with the level, an ending node associated with the level, and if there are any nodes between the starting and ending node. The portion of the file directory tree structure may be further divided at any of the nodes associated with the level. In other embodiments, a portion of file directory tree structure 104 associated with a directory differ may be divided by selecting a node associated with a directory differ, determine a level below the selected node associated with the directory differ, and perform a breadth first search associated with the level below the selected node associated with the directory differ to determine a starting node associated with the level, an ending node associated with the level, and if there are any nodes between the starting and ending node. The portion of the file directory tree structure may be further divided at any of the nodes associated with the level.

The primary directory differ may maintain a data structure that associates all of the directory walkers with a corresponding directory tuple. A secondary directory differ may maintain a data structure that associates its corresponding directory walkers with a directory tuple. The directory walkers associated with a directory differ may be configured to have the same directory tuple. The directory tuple may define the portion of a file directory tree structure that a directory walker is configured to traverse. The directory tuple may include information such as a root node, a starting node, and ending node, and may be represented as (root node, starting node, ending node). In some embodiments, a starting node associated with a portion of a version of a file directory tree structure is undefined or unknown. Since a directory walker is configured to traverse a portion of a file directory tree structure using a preorder traversal with a lexicographical ordering of children nodes, a " " value or a null value may be stored as the starting node of the directory tuple to indicate that a directory walker is to traverse its portion to the first node below the root node associated with the directory walker. In other embodiments, an ending node associated with an interior portion of file directory tree structure 104 is undefined or unknown. In some embodiments, the ending node of the directory tuple is represented as "∞." In other embodiments, the ending node of the directory tuple is represented as the root node of a next portion of the file directory tree structure. The "∞" in the directory tuple may indicate that a directory walker is configured to traverse a portion of file directory tree structure 104 until there are no more nodes to traverse. A directory walker associated with a first directory differ may not traverse one or more nodes of a file directory tree structure that a directory walker associated with a second directory differ is configured to traverse, i.e., the plurality of portions are non-overlapping. By configuring non-overlapping portions with the directory tuple, the directory differs orchestrate the directory walkers to avoid traversing a portion of the file directory tree structure assigned to a different directory walker. Configuring non-overlapping portions may prevent the directory walkers from reporting an inaccurate representation of the file directory tree structure. It is also an efficient use of resources to execute a single traversal of a node in a version of a file directory tree structure, when possible.

Advantageously, using an open ended directory tuple may configure a directory walker assigned to traverse a portion of a second version of file directory tree structure 104 to traverse nodes that were added to the portion since the first version of file directory tree structure 104. For example, the starting node associated with a portion of file directory tree structure 104 may no longer be the first node of the level below the root node of the portion of file directory tree structure 104. It may be the second node of the level below the root node of the portion of file directory tree structure 104. In contrast, hardcoding the starting node as the node that was previously the starting node of the portion of the file directory tree structure may prevent a directory walker from traversing the first node of the level below the root node of the portion of file directory tree structure 104 and the one or more children nodes associated with the first node.

Advantageously, using an open ended directory tuple may provide efficiency by preventing a directory walker assigned to traverse a portion of a second version of file directory tree structure 104 from unnecessarily traversing nodes that were removed from the portion since the first version of file directory tree structure 104. For example, the starting node associated with a portion of file directory tree structure 104 may no longer be the first node of the level below the root node of the portion of file directory tree structure 104. It may have been removed from file directory tree structure 104 since the first version of the file directory tree structure. In contrast, hardcoding the starting node as the node that was previously the starting node of the portion of the file directory tree structure may interfere with operation because the directory walker may not know where to start traversing the portion of file directory tree structure 104.

Each directory walker may be configured to provide checkpoint information to its corresponding directory differ. The checkpoint information may be comprised of node information that indicates the directory walker has or is traversing the node. A directory walker may be configured to provide the checkpoint information after the directory walker has traversed a node. In other embodiments, a directory walker is configured to provide the checkpoint information while the directory walker is traversing the node. In other embodiments, a directory walker is configured to provide the checkpoint information after a couple of nodes have been traversed.

In some embodiments, for a full backup, each corresponding directory differ is associated with two directory walkers. The corresponding directory differ may use only one of the directory walkers to traverse a portion of the version of the file directory tree structure. The output of the directory walker may be compared to a null tree. The difference between the output of the directory walker and the null tree may represent the nodes associated with the portion of the file directory tree structure traversed by the directory walker associated with a corresponding directory differ. In other embodiments, for a full backup, each directory differ is associated with a single directory walker. The nodes traversed by the single directory walker represent the nodes of a portion of the file directory tree structure.

A directory differ may use the checkpoint information to generate one of the checkpoint data stores 116. A checkpoint data store may include node information from the portions of file directory tree structure 104 being traversed by the directory walkers associated with the directory differ. The directory differ may use the checkpoint data store to determine the one or more nodes associated with a portion of file directory tree structure 104. The directory differ may use the checkpoint data store to determine one or more differences between two versions of file directory tree structure 104. A directory walker may be configured to traverse a portion of file directory tree structure 104 using a preorder traversal with lexicographical ordering of children nodes. In the event a portion of file directory tree structure 104 has not changed between file directory tree structure versions, not only is the node information provided by both directory walkers associated with a directory differ the same, but the order of the node information is also the same. In the event a portion of a file directory tree structure has changed between file directory tree structure versions, one of the checkpoint data stores includes additional or removed nodes and the one or more nodes that have been added, deleted, or modified may be easily identified based on an order of the nodes traversed by a directory walker.

Each secondary directory differ may provide its corresponding checkpoint data store to a primary directory differ. The primary directory differ may combine its own checkpoint data store with the secondary directory differ checkpoint data stores to generate one or more consolidated checkpoint data stores. A global checkpoint data store may indicate all of the nodes associated with a file directory tree structure. The global checkpoint data store may indicate which nodes of file directory tree structure 104 were used to divide file directory tree structure 104 into a plurality of portions. In other embodiments, the checkpoint data stores are merged into a plurality of consolidated checkpoint data stores where the number of the plurality of consolidated checkpoint data stores is less than the number of checkpoint data stores associated with each of the directory differs. During a traversal of a file directory tree structure, one of the file directory tree structure portions may be further subdivided into a plurality of portions. As a result, the plurality of portions of the file directory tree structure may not include approximately the same number of nodes. The primary directory differ may use the consolidated checkpoint data store to plan for the next traversal. For example, a primary directory differ may generate new portions for use in a subsequent traversal, according to the number of nodes. For example, a primary directory differ may attempt to balance the portions such that each portion includes approximately the same number of nodes (e.g., each portion having a number of nodes within a range of number of nodes). The consolidated checkpoint data stores are updated according to the balanced portions. One of the consolidated checkpoint data stores may correspond to one of the portions. In other embodiments, a main coordinator (not shown) is configured to receive the plurality of checkpoint data stores from the plurality of directory differs and generate a global checkpoint data store or a plurality of consolidated checkpoint data stores.

The amount of time needed to traverse and determine the data associated with file directory tree structure 104 that was not previously backed up may be reduced by using the one or more consolidated checkpoint data stores 116 because the plurality of portions of the subsequent version of the file directory tree structure are already established. The primary directory differ may be configured to orchestrate a traversal of a second version of file directory tree structure 104 using the one or more consolidated checkpoint data stores 116 to determine one or more differences between the first and second versions of file directory tree structure 104. The one or more differences may correspond to data associated with file directory tree structure 104 that was not previously backed up. The one or more consolidated checkpoint data stores 116 may indicate the plurality of portions associated with the first version of file directory tree structure 104. The primary directory differ may assign a corresponding directory differ to each of the plurality of portions. Each directory differ 114 is associated with a directory walker. The directory walker may be configured to traverse an assigned portion of the second version of file directory tree structure 104 and provide traversal data to an associated directory differ 114. The directory differ may receive traversal data from a directory walker and compare the traversal data to a consolidated checkpoint data store to determine one more differences between the first and second versions of the file directory tree structures 104. The plurality of directory differs and associated directory walkers may reduce the amount of time needed to traverse the two versions of the file data tree structure because instead of having a single directory walker to traverse a first file directory tree structure and a single directory walker to traverse a second file directory tree structure, a plurality of directory walkers may be used in parallel to traverse the second file directory tree structure.

In some embodiments, file directory tree structure 104 has not changed more than a threshold amount between a first version of file directory tree structure 104 and a second version of file directory tree structure 104. For example, the plurality of portions of the file directory tree structures include approximately the same number of nodes (e.g., a threshold number of nodes have not been either added or removed from a portion of a file directory tree structure). A plurality of directory differs may provide their corresponding checkpoint data stores to the primary directory differ. The primary directory differ may determine the differences between the two versions of the file directory tree structure based on the checkpoint data stores associated with the plurality of directory differs and determine the data associated with a file directory tree structure that has not been backed up. Storage system 112 may request from primary system 102 the data associated with file directory tree structure 104 that has not been backed up and primary system 102 may then perform an incremental backup of file directory tree structure 104 by sending the requested data.

In some embodiments, directory differs 114 are used back up data received from primary system 102 in parallel. For example, an output of directory differs 114 is consumed by storage system 112 and a plurality of sub-trees are backed up in parallel.

Figure 2A:
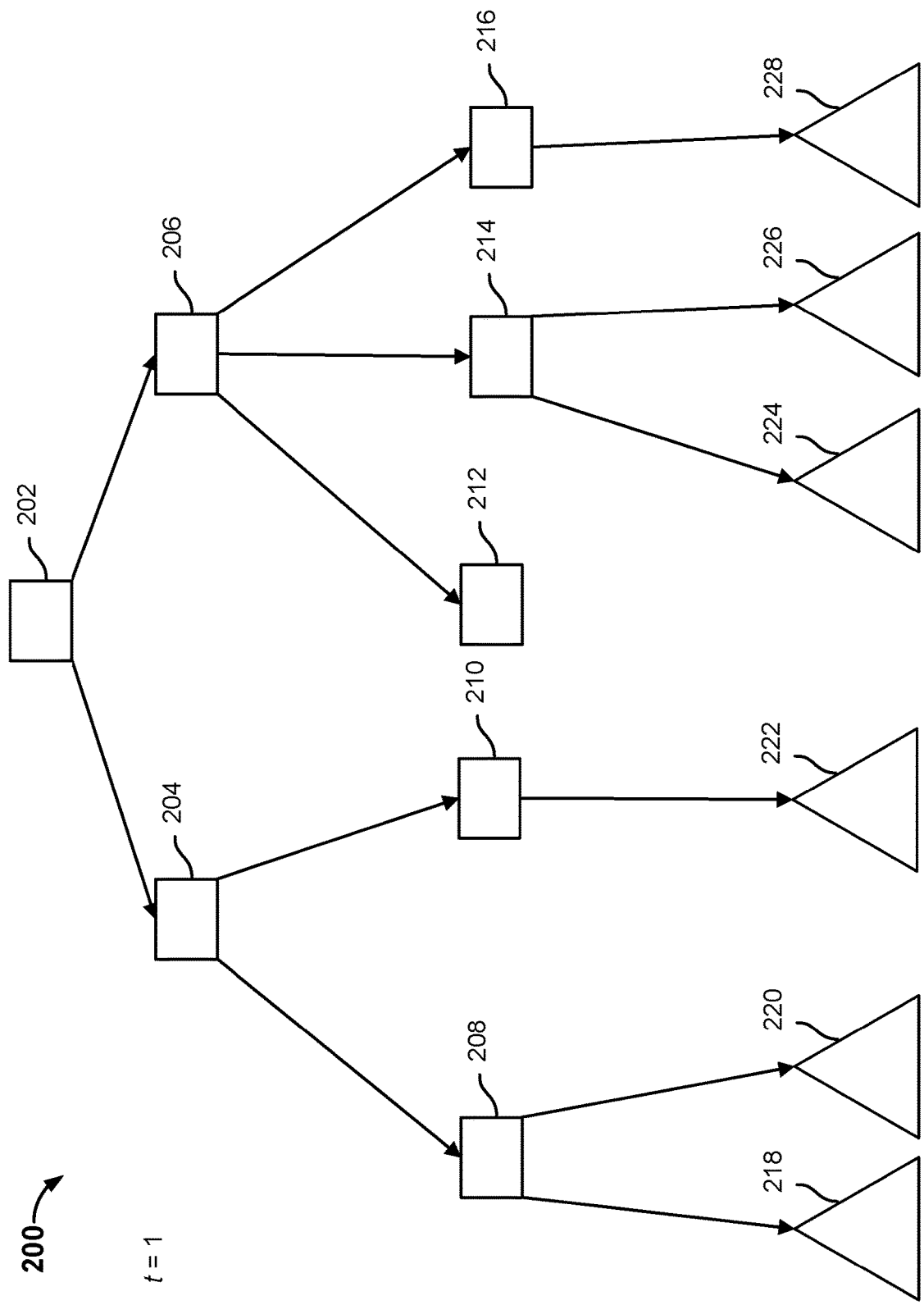
FIG. 2A is a diagram illustrating a file directory tree structure in accordance with some embodiments.

FIG. 2A is a diagram illustrating a file directory tree structure in accordance with some embodiments. File directory tree structure 200 may correspond to a storage snapshot of a file directory at a particular moment in time t, for example at t=1. File directory tree structure 200 may be stored by a computing system, such as primary system 102 or storage system 112.

In the example shown, file directory tree structure 200 is comprised of root node 202, a first level of intermediate nodes 204, 206 and a second level of intermediate nodes 208, 210, 214, 216, and leaf node 212. Root node 202 may be associated with a root of a file directory, e.g., "C:\." An intermediate node may correspond to a sub-directory or a file. For example, intermediate nodes 204, 206, 208, 210, 214, 216 may correspond to a sub-directory. Leaf node 212 may correspond to a sub-directory (e.g., an empty sub-directory) or a file. Intermediate node 208 is associated with sub-trees 218, 220, intermediate node 210 is associated with sub-tree 222, intermediate node 214 is associated with sub-trees 224, 226, and intermediate node 216 is associated with sub-tree 228.

A sub-tree may be comprised of a plurality of levels. A top level of the sub-tree may be comprised of a single node. The sub-tree may be comprised of zero or more levels of intermediate nodes and a level of one or more leaf nodes. Sub-trees 218, 220, 222, 224, 226, 228 may be comprised of a different number of nodes and a different number of levels. For example, sub-tree 218 may be comprised of a top node and a single leaf node while sub-tree 220 is comprised of a top node, an upper intermediate level having 50 nodes, and each intermediate node being associated with 10 leaf nodes.

A directory walker may be configured to traverse file directory tree structure 200 using a preorder traversal with a lexicographical ordering of children nodes. For example, a directory walker may traverse file directory tree structure 200 in the following order: node 202, node 204, node 208, the nodes of sub-tree 218, the nodes of sub-tree 220, node 210, the nodes of sub-tree 222, node 206, node 212, node 214, the nodes of sub-tree 224, the nodes of sub-tree 226, node 216, and the nodes of sub-tree 228.

File directory tree structure 200 may be divided into a plurality of portions. Each portion may be assigned a directory differ and directory walker. A directory walker may traverse its assigned portion and notify the associated directory differ of the one or more nodes traversed by the directory walker. As described herein, file directory tree structure 200 may be initially divided prior to being traversed and dynamically divided as file directory tree structure 200 is being traversed.

Figure 2B:
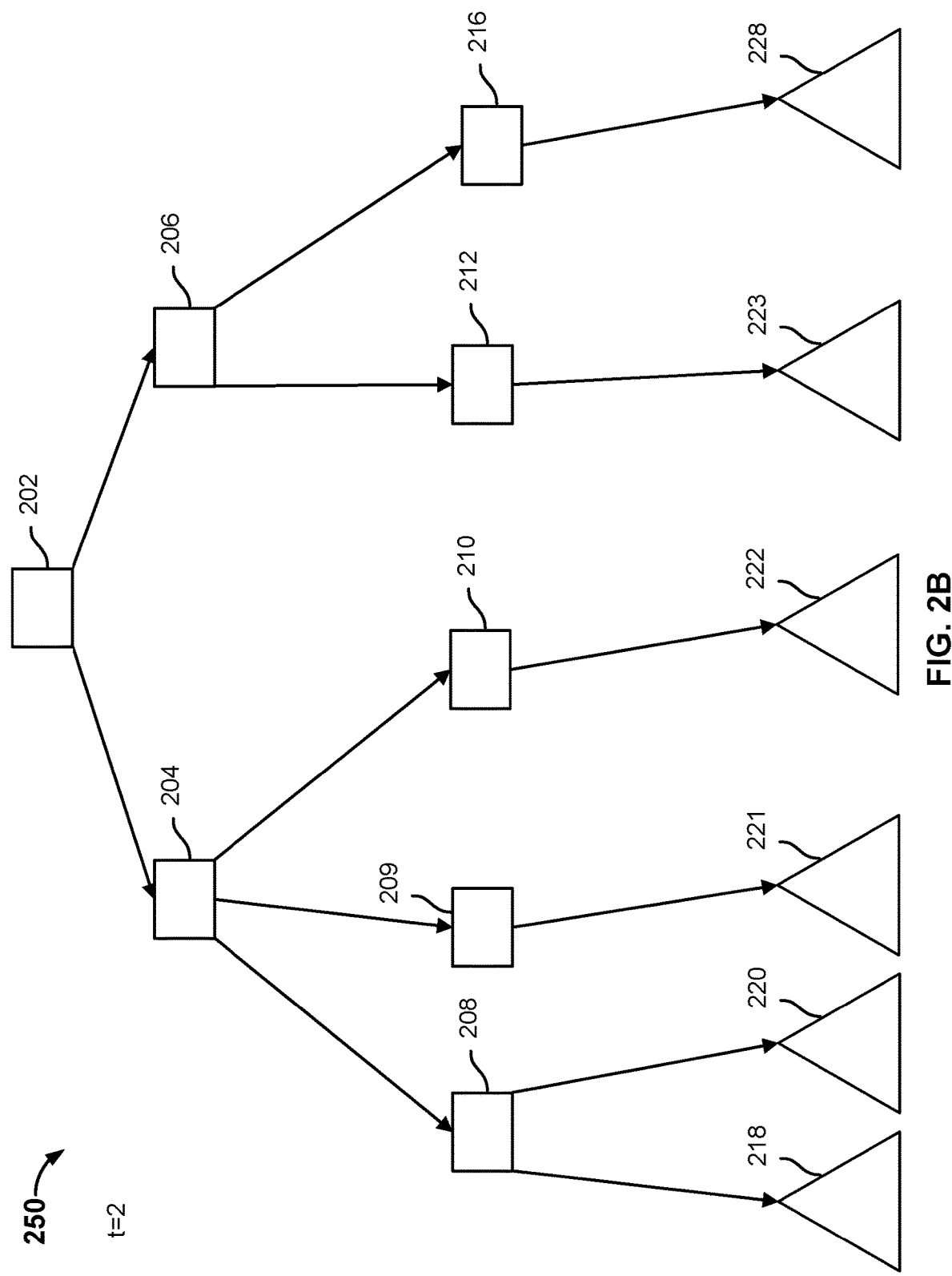
FIG. 2B is a diagram illustrating a file directory tree structure in accordance with some embodiments.

FIG. 2B is a diagram illustrating a file directory tree structure in accordance with some embodiments. File directory tree structure 250 may correspond to a storage snapshot of a file directory at a particular moment in time t, for example at t=2. File directory tree structure 250 may be stored by a computing system, such as primary system 102 or storage system 112.

In the example shown, file directory tree structure 250 is comprised of root node 202, a first level of intermediate nodes 204, 206 and a second level of intermediate nodes 208, 209, 210, 212, 216. Intermediate node 208 is associated with sub-trees 218, 220, intermediate node 209 is associated with sub-tree 221, intermediate node 210 is associated with sub-tree 222, intermediate node 212 is associated with sub-tree 223, and intermediate node 216 is associated with sub-tree 228.

File directory tree structure 250 is a modified version of file directory tree structure 200. Since t=1, file directory tree structure 200 has been modified to include intermediate node 209, sub-tree 221, and sub-tree 223, and to remove intermediate node 214, sub-tree 224, and sub-tree 226.

Similar to file directory tree structure 200, file directory tree structure 250 may be traversed using a preorder traversal with a lexicographical ordering of children nodes. For example, a directory walker may traverse the file directory tree structure in the following order: node 202, node 204, node 208, the nodes of sub-tree 218, the nodes of sub-tree 220, node 209, the nodes associated with sub-tree 221, node 210, the nodes of sub-tree 222, node 206, node 212, the nodes associated with sub-tree 223, node 216, and the nodes of sub-tree 228.

Figure 3A:
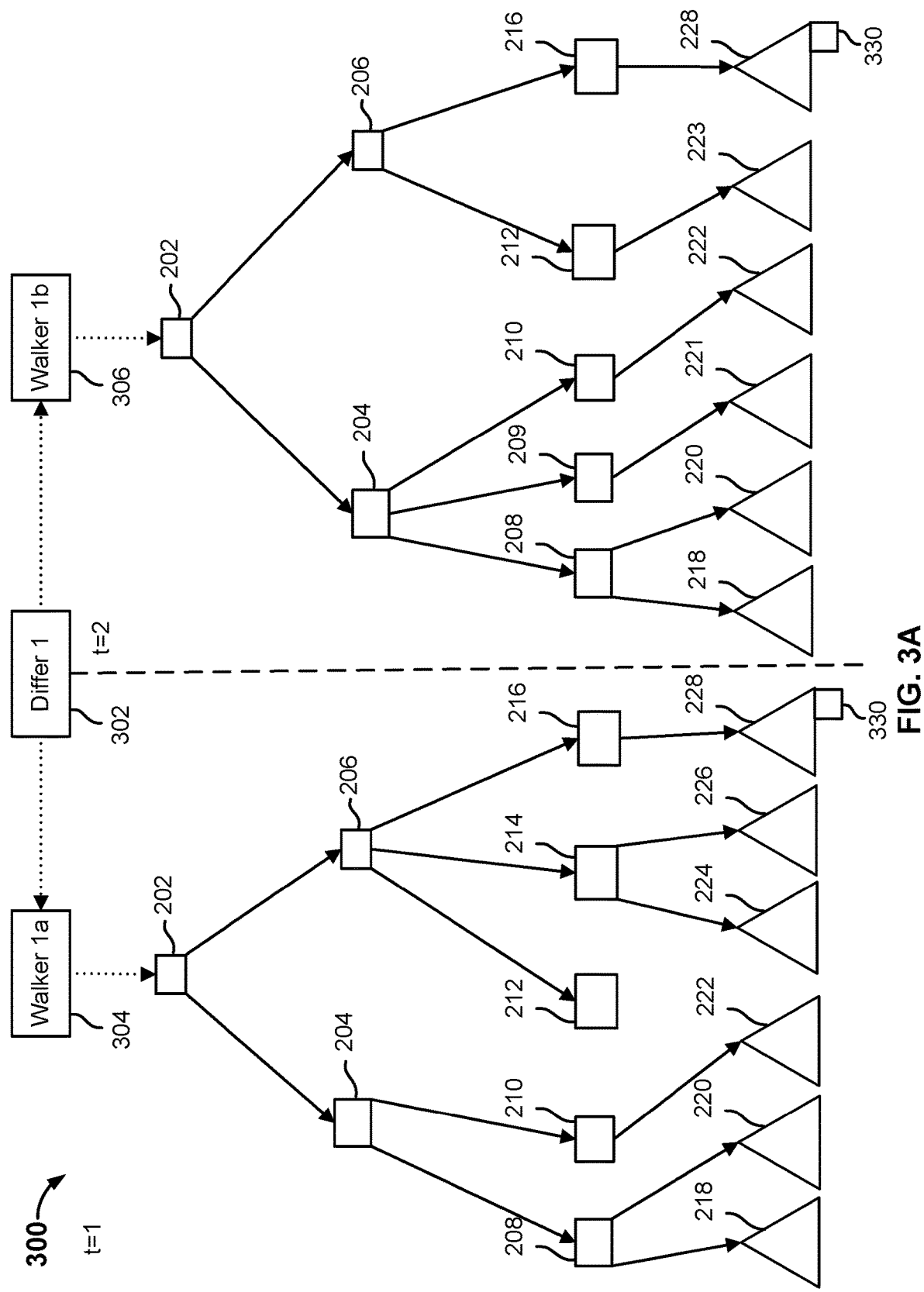
FIG. 3A is a diagram illustrating an example of a view of file directory tree structures.

FIG. 3A is a diagram illustrating an example of a view of file directory tree structures. View 300 may be accessed by a directory differ, such as one of the directory differs 114.

In the example shown, primary directory differ 302 may be used to traverse file directory tree structure 200 and file directory tree structure 250 in parallel to determine one or more differences between the file directory tree structures. Primary directory differ 302 may be associated with directory walker 304 and directory walker 306. Directory walker 304 may be configured to traverse file directory tree structure 200 and directory walker 306 may be configured to traverse file directory tree structure 250.

A directory walker may be associated with a directory tuple. The directory tuple may indicate a root node, a starting node, and an ending node associated with a directory walker. The two directory walkers associated with a directory differ may be associated with the same directory tuple. For example, directory walker 304 and directory walker 306 may be associated with a directory tuple of (node 202, node 204, leaf node 330 of sub-tree 228). In some embodiments, a starting node associated with a directory walker is undefined or unknown. The directory tuple for such a walker may be specified as: (root node, " ", ending node). In some embodiments, an ending node associated with a directory walker is undefined or unknown. For example, an initial file directory tree directory may be associated with a million nodes. A root node and a starting node of the file directory tree directory may be known, but a last node of a lexicographical preorder traversal may be initially undefined or unknown. The directory tuple for such a walker may be specified as: (root node, starting node, co).

Directory walker 304 may determine the nodes associated with file directory tree structure 200 to be node 202, node 204, node 208, all of the nodes associated with sub-tree 218, all of the nodes associated with sub-tree 220, node 210, all of the nodes associated with sub-tree 222, node 206, node 212, node 214, all the nodes associated with sub-tree 224, all of the nodes associated with sub-tree 226, node 216, and all of the nodes associated with sub-tree 228.

Directory walker 306 may determine the nodes associated with file directory tree structure 250 to be node 202, node 204, node 208, all of the nodes associated with sub-tree 218, all of the nodes associated with sub-tree 220, node 209, all of the nodes associated with sub-tree 221, node 210, all of the nodes associated with sub-tree 222, node 206, node 212, all of the nodes associated with sub-tree 223, node 216, and all of the nodes associated with sub-tree 228.

Directory walkers 304, 306 may send checkpoint information to primary directory differ 302. Primary directory differ 302 may maintain a checkpoint data store that stores the one or more nodes traversed by directory walker 304 and the one or more nodes traversed by directory walker 306. Primary directory differ 302 may compare the one or more nodes traversed by directory walker 304 and the one or more nodes traversed by directory walker 306 to determine that node 209, the nodes associated with sub-tree 221, and the nodes associated with sub-tree 223 were added in between storage snapshots while node 214, the nodes associated with sub-tree 224, and the nodes associated with sub-tree 226 were removed in between storage snapshots.

While the one or more differences between file directory tree structure 200 and file directory tree structure 250 may be determined, the amount of time to traverse both file directory tree structures may take too long.

Figure 3B:
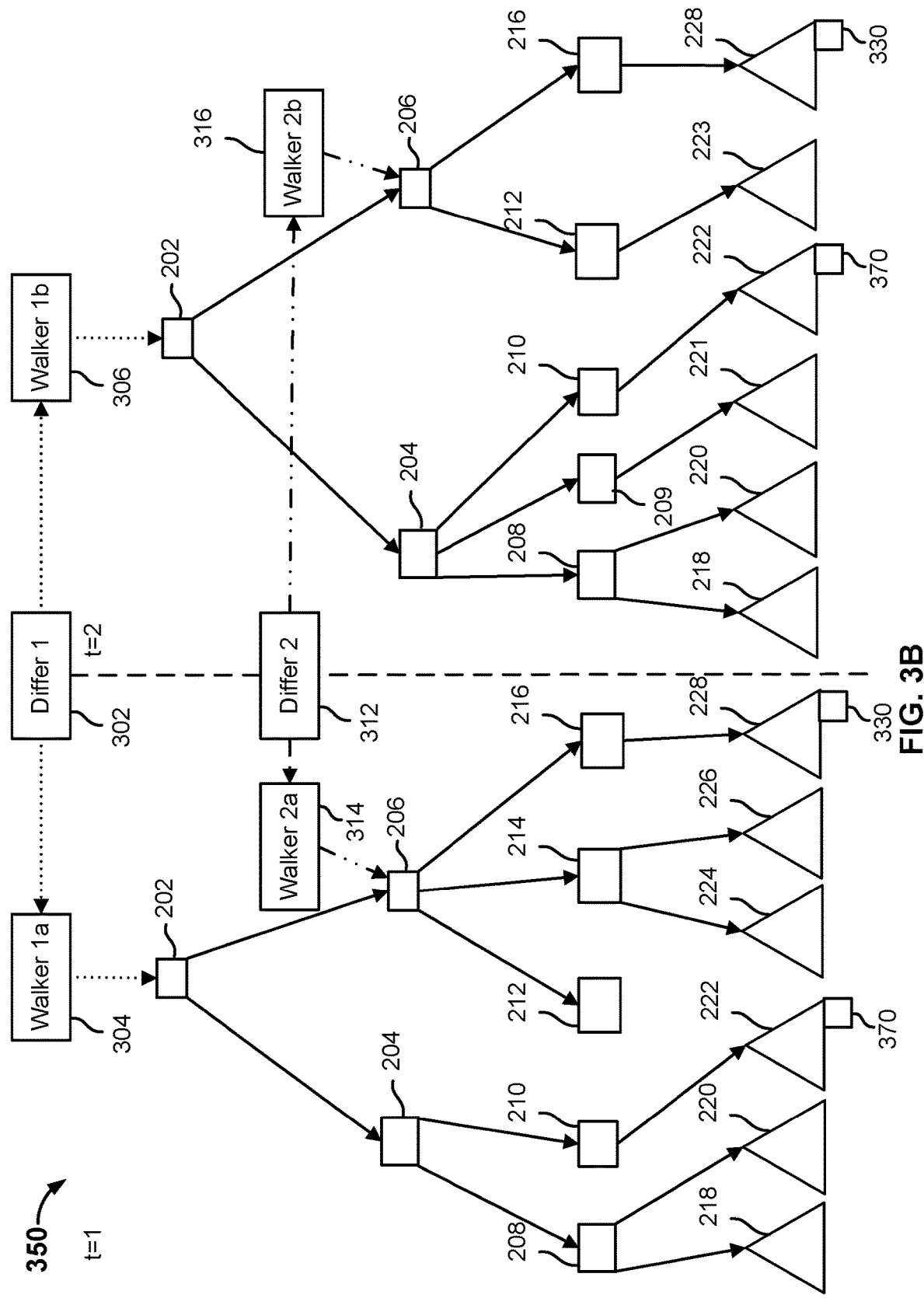
FIG. 3B is a diagram illustrating a view of file directory tree structures in accordance with some embodiments.

FIG. 3B is a diagram illustrating a view of file directory tree structures in accordance with some embodiments. View 350 may be accessed by a plurality of directory differs, such as directory differs 114.

A primary directory differ, e.g., primary directory differ 302, may divide a file directory tree structure into a plurality of portions to reduce an amount of time needed to traverse a file directory tree structure. In some embodiments, a file directory tree structure is divided prior to the file directory tree structure being traversed. Primary directory differ 302 may divide a file directory tree structure into n portions. A secondary directory differ may be associated with one of the file directory tree structure portions. In the example shown, primary directory differ 302 has divided file directory tree structure 200 into two portions: a first portion associated with primary directory differ 302 and a second portion associated with secondary directory differ 312. Each directory differ is associated with two directory walkers: one directory walker to traverse a portion of a file directory tree structure associated with a first moment in time and a second directory walker to traverse the same portion, but of the file directory tree structure associated with a second moment in time.

Primary directory differ 302 may maintain a data structure that associates directory walkers 304, 314, 306, 316 with a corresponding directory tuple. Secondary directory differ 312 may maintain a data structure that associates its corresponding directory walkers with a directory tuple. A directory tuple may be comprised of (root node, starting node, ending node). The directory walkers associated with a directory differ may be configured to have the same directory tuple. In the example shown, directory walkers 304, 306 are both associated with the directory tuple (node 202, node 204, node 370), (node 202, node 204, ∞), (node 202, " ", ∞), or (node 202, " ", node 370) and directory walkers 314, 316 are both associated with the directory tuple (node 206, node 212, node 330), (node 206, " ", node 330), (node 206, node 212, ∞), or (node 206, " ", ∞). In some embodiments, an ending node associated with a portion of the file directory tree structure is undefined or unknown, but a starting node associated with a next portion of the file directory tree structure is known. The directory tuple may be represented as (root node, starting node, next starting node). In other embodiments, an ending node associated with a last portion of the file directory tree structure is undefined or unknown. The directory tuple may be represented as (root node, starting node, ∞). The "∞" in the directory tuple may indicate that a directory walker is configured to traverse a portion of the tree until there are no more nodes to traverse.

Instead of traversing the entire file directory tree structure as illustrated in FIG. 3A, directory walker 304 is configured to traverse node 204, node 208, all of the nodes of sub-tree 218, all of the nodes of subtree 220, node 210, and all of the nodes of sub-tree 222. Directory walker 306 is configured to traverse node 204, node 208, all of the nodes of sub-tree 218, all of the nodes of subtree 220, node 209, all of the nodes of sub-tree 221, node 210, and all of the nodes of sub-tree 222.

Directory walker 314 is configured to traverse a second portion of file directory tree structure 200 and directory walker 316 is configured to traverse the second portion of file directory tree structure 250. Directory walker 314 is configured to traverse node 212, node 214, all of the nodes of sub-tree 224, all of the nodes of sub-tree 226, node 216, and all of the nodes of sub-tree 228. Directory walker 316 is configured to traverse node 212, all of the nodes of sub-tree 223, node 216, and all of the nodes of sub-tree 228.

Each directory walker may be configured to provide checkpoint information to its corresponding directory differ. The checkpoint information is comprised of node information that indicates the directory walker has or is traversing the node. A directory walker may be configured to provide the checkpoint information after the directory walker has traversed a node. In other embodiments, a directory walker may be configured to provide the checkpoint information while the directory walker is traversing the node. In other embodiments, a directory walker may be configured to provide the checkpoint information after a couple of nodes have been traversed. In the example shown, directory walkers 304, 306 are configured to provide checkpoint information to primary directory differ 302 and directory walkers 314, 316 are configured to provide checkpoint information to secondary directory differ 312.

A directory differ may use the checkpoint information to generate a checkpoint data store. The checkpoint data store includes node information from the portions of the file directory tree structures being traversed by the directory walkers associated with the directory differ. The directory differ may use the checkpoint data store to determine one or more differences between two file directory tree structures. A directory walker may be configured to traverse a portion of a file directory tree structure using a preorder traversal with a lexicographical ordering of children nodes. In the event a portion of a file directory tree structure has not changed between file directory tree structure versions, not only is the node information provided by both directory walkers associated with a directory differ the same, but the order of the node information is also the same. In the event a portion of a file directory tree structure has changed between file directory tree structure versions, the one or more nodes that have been added, deleted, or modified may be easily identified based on an order of the nodes traversed by a directory walker.

For example, the node information provided from directory walker 304 to primary directory differ 302 has the following order: node 204, node 208, all of the nodes of sub-tree 218, all of the nodes of sub-tree 220, node 210, and all of the nodes of sub-tree 222. The node information provided from directory walker 306 to primary directory differ 302 has the following order: node 204, node 208, all of the nodes of sub-tree 218, all of the nodes of sub-tree 220, node 209, all of the nodes of sub-tree 221, node 210, and all of the nodes of sub-tree 222. Secondary directory differ 312 may use the node information to determine that node 209 and all of the nodes of sub-tree 221 were added between the storage snapshot associated with file directory tree structure 200 and the storage snapshot associated with file directory tree structure 250.

The node information provided from directory walker 314 to secondary directory differ 312 has the following order: node 212, node 214, all of the nodes of sub-tree 224, all of the nodes of sub-tree 226, node 216, and all of the nodes of sub-tree 228. The node information provided from directory walker 316 to secondary directory differ 312 has the following order: node 212, all of the nodes of sub-tree 223, node 216, and all of the nodes of sub-tree 228. Secondary directory differ 312 may use the node information to determine that node 214, all of the nodes of sub-tree 224, and all of the nodes of sub-tree 226 were removed between the storage snapshot associated with file directory tree structure 200 and the storage snapshot associated with file directory tree structure 250.

Each secondary directory differ may provide its corresponding checkpoint data store to primary directory differ 302. Primary directory differ 302 may combine its own checkpoint data store with the secondary directory differ checkpoint data stores to generate one or more consolidated checkpoint data stores.

In some embodiments, the checkpoint data stores are merged into a global checkpoint data store. The global checkpoint data store may include split information that indicates which nodes of the file directory tree structure were used to split the file directory tree structure into a plurality of portions. The global checkpoint data store may indicate all of the nodes associated with a file directory tree structure.

In other embodiments, the checkpoint data stores are merged into a plurality of checkpoint data stores where the number of the plurality of checkpoint data stores is less than the number of checkpoint data stores associated with each of the directory walkers. A file directory tree structure may be divided into a plurality of portions, each portion having approximately the same number of nodes (e.g., each portion having a number of nodes within a threshold number of nodes). One of the consolidated checkpoint data stores may correspond to one of the portions.

Primary directory differ 302 may determine the differences between file directory tree structures 200, 250 based on data received from the plurality of secondary directory differs and determine the data associated with file directory tree structure 250 that has not been backed up.

In other embodiments, the file directory tree structure is dynamically divided after a portion of the file directory tree structure has been traversed. In some embodiments, primary directory differ 302 may select one of the active directory differs, stop a traversal of the file directory tree structure portion associated with the selected active directory differ, divide the portion associated with the selected directory differ into a plurality of sub-portions, and assign a corresponding differ to the plurality of sub-portions.

Figure 3C:
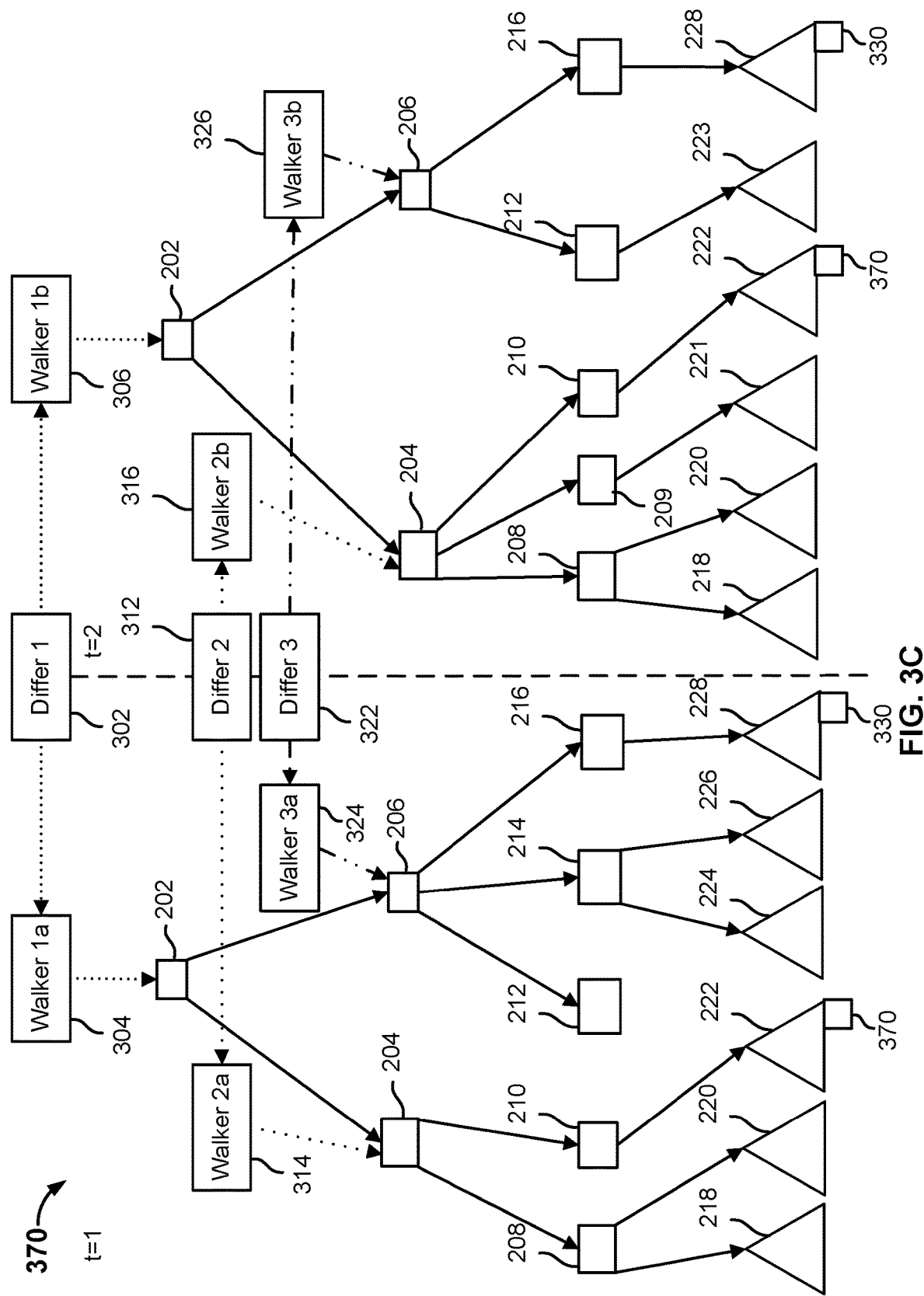
FIG. 3C is a diagram illustrating a view of file directory tree structures in accordance with some embodiments.

FIG. 3C is a diagram illustrating a view of file directory tree structures in accordance with some embodiments. View 370 may be accessed by a plurality of directory differs, such as the directory differs 114.

A primary directory differ, e.g., primary directory differ 302, may divide a file directory tree structure into a plurality of portions to reduce an amount of time needed to traverse a file directory tree structure. In some embodiments, a file directory tree structure is divided prior to the file directory tree structure being traversed. Primary directory differ 302 may divide a file directory tree structure into n portions. A secondary directory differ may be associated with one of the file directory tree structure portions. In the example shown, primary directory differ 302 has divided file directory tree structure 200 into three portions: a first portion associated with primary directory differ 302, a second portion associated with secondary directory differ 312, and a third portion associated with third directory differ 322. Each secondary directory differ is associated with two directory walkers: one directory walker to traverse a portion of a file directory tree structure associated with a first moment in time and a second directory walker to traverse the same portion, but of the file directory tree structure associated with a second moment in time.

Primary directory differ 302 may maintain a data structure that associates directory walkers 314, 316, 324, 326 with a corresponding directory tuple. Secondary directory differs 312, 322 may maintain a data structure that associates its corresponding directory walkers with a directory tuple. A directory tuple may be comprised of (root node, starting node, ending node) or (root node, starting node, ending node, depth level). The directory walkers associated with a directory differ may be configured to have the same directory tuple. In the example shown, directory walkers 304, 306 are both associated with the directory tuple (node 202, node 204, node 206), directory walkers 314, 316 are both associated with the directory tuple (node 204, node 208, node 370), and directory walkers 324, 326 are both associated with the directory tuple (node 206, node 212, node 330).

Instead of traversing the entire file directory tree structure as illustrated in FIG. 3A, directory walker 304 is configured to traverse nodes 202, 204, and 206 of file directory tree structure 200 and directory walker 306 is configured to traverse nodes 202, 204, and 206 of file directory tree structure 250. Directory walker 314 is configured to traverse a second portion of file directory tree structure 200 and directory walker 316 is configure to traverse a second portion of file directory tree structure 250. The second portion of file directory tree structure 200 includes node 204, node 208, all of the nodes of sub-tree 218, all of the nodes of sub-tree 220, node 210, and all of the nodes of sub-tree 222. The second portion of file directory tree structure 250 includes node 204, node 208, all of the nodes of sub-tree 218, all of the nodes of sub-tree 220, node 209, all of the nodes of sub-tree 221, node 210, and all of the nodes of sub-tree 222. Directory walker 324 is configured to traverse a third portion of file directory tree structure 200 and directory walker 326 is configured to traverse a third portion of file directory tree structure 250. The third portion of file directory tree structure 200 includes node 206, node 212, node 214, all of the nodes of sub-tree 224, all of the nodes of sub-tree 226, node 216, and all of the nodes of sub-tree 228. The third portion of file directory tree structure 250 includes node 206, node 212, all of the nodes of sub-tree 223, node 216, and all of the nodes of sub-tree 228.

Each directory walker may be configured to provide checkpoint information to its corresponding directory differ. The checkpoint information is comprised of node information that indicates the directory walker has or is traversing the node. A directory walker may be configured to provide the checkpoint information after the directory walker has traversed a node. In other embodiments, a directory walker may be configured to provide the checkpoint information while the directory walker is traversing the node. In other embodiments, a directory walker may be configured to provide the checkpoint information after a couple of nodes have been traversed. In the example shown, directory walkers 304, 306 are configured to provide checkpoint information to primary directory differ 302, directory walkers 314, 316 are configured to provide checkpoint information to secondary directory differ 312, and directory walkers 324, 326 are configured to provide checkpoint information to secondary directory differ 322.

A directory differ may use the checkpoint information to generate a checkpoint data store. The checkpoint data store includes node information from the portions of the file directory tree structures being traversed by the directory walkers associated with the directory differ. The directory differ may use the checkpoint data store to determine one or more differences between two file directory tree structures. A directory walker may be configured to traverse a portion of a file directory tree structure using a preorder traversal with a lexicographical ordering of children nodes. In the event a portion of a file directory tree structure has not changed between file directory tree structure versions, not only is the node information provided by both directory walkers associated with a directory differ the same, but the order of the node information is also the same. In the event a portion of a file directory tree structure has changed between file directory tree structure versions, the one or more nodes that have been added, deleted, or modified may be easily identified based on an order of the nodes traversed by a directory walker.

For example, the node information provided from directory walker 314 to secondary directory differ 312 has the following order: node 204, node 208, all of the nodes of sub-tree 218, all of the nodes of sub-tree 220, node 210, and all of the nodes of sub-tree 222. The node information provided from directory walker 316 to secondary directory differ 312 has the following order: node 204, node 208, all of the nodes of sub-tree 218, all of the nodes of sub-tree 220, node 209, all of the nodes of sub-tree 221, node 210, and all of the nodes of sub-tree 222. Secondary directory differ 312 may use the node information to determine that node 209 and all of the nodes of sub-tree 221 were added between the storage snapshot associated with file directory tree structure 200 and the storage snapshot associated with file directory tree structure 250.

The node information provided from directory walker 324 to secondary directory differ 322 has the following order: node 206, node 212, node 214, all of the nodes of sub-tree 224, all of the nodes of sub-tree 226, node 216, and all of the nodes of sub-tree 228. The node information provided from directory walker 326 to secondary directory differ 322 has the following order: node 206, node 212, all of the nodes of sub-tree 223, node 216, and all of the nodes of sub-tree 228. Secondary directory differ 322 may use the node information to determine that node 214, all of the nodes of sub-tree 224, and all of the nodes of sub-tree 226 were removed between the storage snapshot associated with file directory tree structure 200 and the storage snapshot associated with file directory tree structure 250.

Each secondary directory differ may provide its corresponding checkpoint data store to primary directory differ 302. Primary directory differ 302 may combine its own checkpoint data store with the secondary directory differ checkpoint data stores to generate one or more consolidated checkpoint data stores. In some embodiments, the checkpoint data stores are merged into a global checkpoint data store. The global checkpoint data store may include split information that indicates which nodes of the file directory tree structure were used to split the file directory tree structure into a plurality of portions.

In other embodiments, the checkpoint data stores are merged into a plurality of checkpoint data stores where the number of the plurality of checkpoint data stores is less than the number of checkpoint data stores associated with each of the directory walkers. A file directory tree structure may be divided into a plurality of portions, each portion having approximately the same number of nodes (e.g., each portion having a number of nodes within a threshold number of nodes). One of the consolidated checkpoint data stores may correspond to one of the portions.

Primary directory differ 302 may determine the differences between file directory tree structures 200, 250 based on data received from the plurality of secondary directory differs and determine the data associated with file directory tree structure 250 that has not been backed up.

In other embodiments, the file directory tree structure is dynamically divided after a portion of the file directory tree structure has been traversed. In some embodiments, primary directory differ 302 may select one of the active directory differs, stop a traversal of the file directory tree structure portion associated with the selected active directory differ, divide the portion associated with the selected directory differ into a plurality of sub-portions, assign a corresponding differ to the plurality of sub-portions, resume the traversal of the file directory tree structure portion associated with the selected active directory differ, and initiate a traversal of the new file directory tree sub-portions associated with the corresponding differs.

In other embodiments, a secondary differ may further sub-divide an assigned portion of a file directory tree structure into a plurality of sub-portions. A directory differ may be associated with one of the file directory tree structure sub-portions. A directory tuple associated with the secondary directory differ may be (root node, starting node, ending node, depth level) and the directory tuple associated with the directory differs associated with the sub-portions may be comprised of (root node, starting node, ending node). The directory walkers associated with a directory differ may be configured to have the same directory tuple.

Figure 4A:
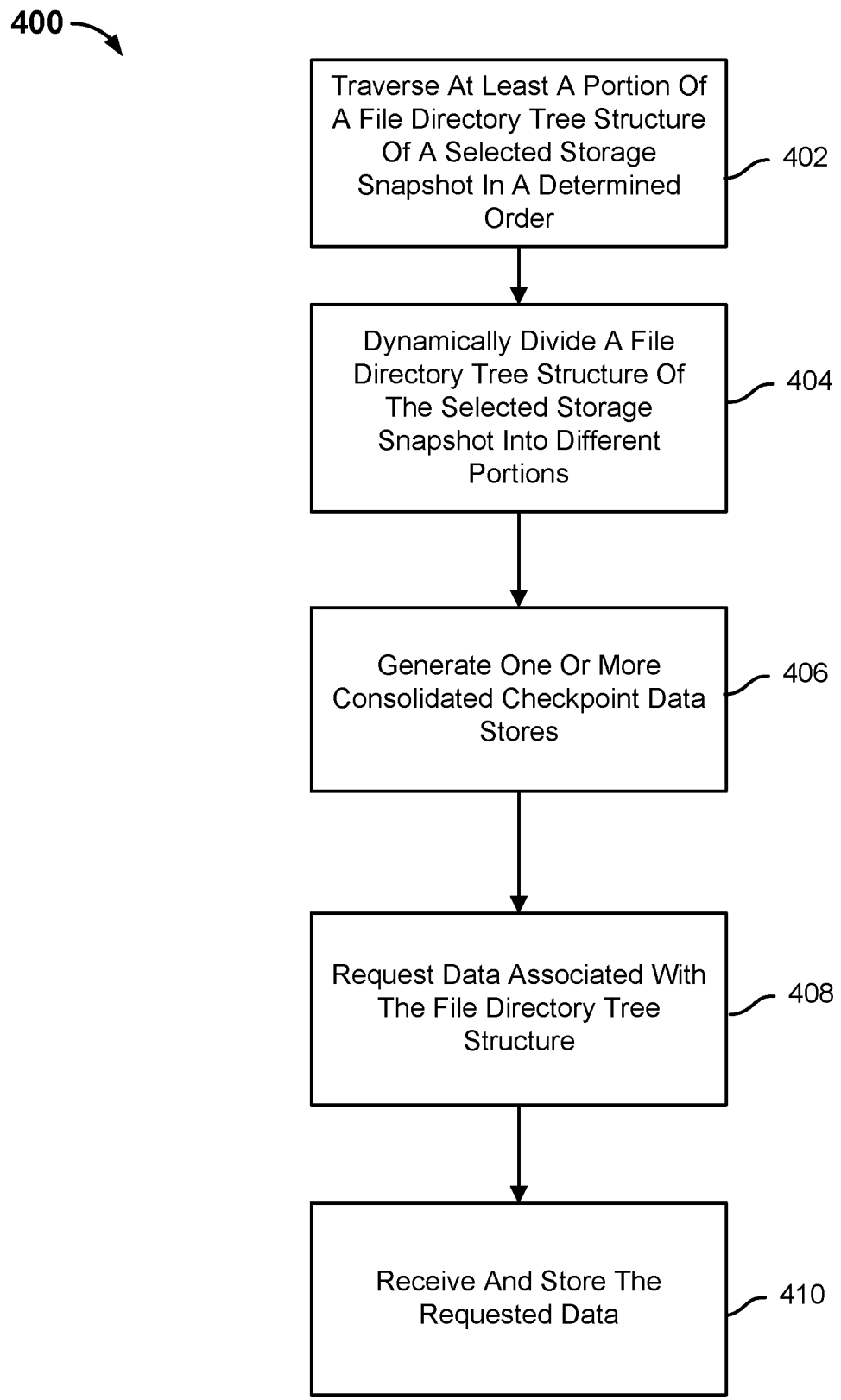
FIG. 4A is a flow chart illustrating a process for traversing a file directory tree structure in parallel in accordance with some embodiments.

FIG. 4A is a flow chart illustrating a process for traversing a file directory tree structure in parallel in accordance with some embodiments. Process 400 may be performed by a storage system, such as storage system 112. Process 400 may be implemented to perform a full backup of a file directory tree structure.

At 402, at least a portion of a file directory tree structure of a selected storage snapshot is traversed in a determined order.

A primary system may include a file system that uses a file directory tree structure to organize the directory, sub-directories, and files. The primary system may perform a snapshot of the file directory tree structure and store the file directory tree structure snapshot as a storage snapshot. A storage snapshot may correspond to a version of the file directory tree structure at a particular moment in time. A storage snapshot may store all of the nodes associated with the file directory tree structure.

The primary storage system may be configured to perform a backup of the file directory tree structure. The backup may correspond to a full backup of the file directory tree structure or an incremental backup of the file directory tree structure. A full backup of the file directory tree structure includes data associated with all of the nodes of the file directory tree structure.

The primary system may store a plurality of storage snapshots corresponding to different versions of the file directory tree structure. A storage system may remotely access the plurality of storage snapshots and select one of the storage snapshots. For example, the selected storage snapshot may correspond to a version of the file directory tree structure that was not backed up to the secondary storage system.

The file directory tree structure associated with the selected snapshot may be comprised of a large number of nodes (e.g., millions). The file directory tree structure may be comprised of a plurality of levels (e.g., root level, one or more levels of intermediate nodes, a leaf node level). It may take a long period of time to traverse the entire file directory tree structure and determine a location for all of the nodes. Instead, at least a portion of the file directory tree structure associated with the selected snapshot may be traversed to determine the nodes associated with a plurality of upper levels associated with the file directory tree structure associated with the selected snapshot and the plurality of nodes included in the plurality of upper levels. In some embodiments, the file directory tree structure is traversed using a preorder traversal with lexicographical ordering of children nodes to determine the plurality of upper levels. In other embodiments, the file directory tree structure is traversed using a breadth first traversal to determine the plurality of upper levels.

At 404, a file directory tree structure of the selected storage snapshot is dynamically divided into different portions. The file directory tree structure of the selected storage snapshot may be dynamically divided after traversal of the file directory tree structure has commenced based on one or more factors (e.g., amount of resources available, the actual time needed to traverse a portion of a file directory tree structure is taking more time than an expected amount of time needed to traverse the portion of the file directory tree structure, one of the directory differs and associated directory walkers has finished traversing their corresponding portion of the file directory tree structure, etc.). The file directory tree structure of the selected storage snapshot may be dynamically divided any time after traversal of the file directory tree structure has commenced and before the entire file directory tree structure has been traversed.

The determined upper levels of the selected snapshot and the determined nodes included in the determined upper levels may be used to initially divide the file directory tree structure of the selected storage snapshot into a plurality of portions before the file directory tree structure is traversed and the file directory tree structure may be further divided after at least a portion of the file directory tree structure has been traversed.

A primary directory differ may be configured to orchestrate a traversal of a version of the file directory tree structure. The primary directory differ may dynamically divide a file directory tree structure into a plurality of portions and assign a corresponding directory differ to each of the plurality of portions. Each directory differ is associated with a directory walker. The directory walker may be configured to traverse an assigned portion of the version of the file directory tree structure using a preorder traversal with lexicographical ordering of children nodes. Each directory walker may be associated with a directory tuple. The directory tuple may define the portion of a file directory tree structure that a directory walker is configured to traverse. The directory tuple may include information such as a root node, a starting node, and ending node, and may be represented as (root node, starting node, ending node). By configuring non-overlapping portions with the directory tuple, the directory differs orchestrate the directory walkers to avoid traversing a portion of the file directory tree structure assigned to a different directory walker. Configuring non-overlapping portions may prevent the directory walkers from reporting an inaccurate representation of the file directory tree structure. It is also an efficient use of resources to execute a single traversal of a node in a version of a file directory tree structure, when possible.

In some embodiments, each directory differ is associated with two directory walkers. The corresponding directory differ may use only one of the directory walkers to traverse a portion of the version of the file directory tree structure. The output of the directory walker may be compared to a null tree. The difference between the output of the directory walker and the null tree may represent the nodes associated with the portion of the file directory tree structure traversed by the directory walker associated with a corresponding directory differ.

In some embodiments, the file directory tree structure 104 is divided prior to the file directory tree structure being traversed. To divide a version of the file directory tree structure 104, the primary directory differ may determine a root node associated with the version of file directory tree structure 104, determine a level below the root node associated with the version of file directory tree structure 104, and perform a breadth first search associated with the level below the root node to determine the plurality of nodes associated with the level. The number of nodes associated with the level may be n. The file directory tree structure may be divided into 2 to n portions where any of the nodes of the level may be used to divide file directory tree structure.

The primary directory differ may further divide a portion of the file directory tree structure. The primary directory differ may select a node included in the portion of the file directory tree structure. The selected node may be associated with a plurality of children nodes. The primary directory differ may determine a level below the selected node, perform a breadth first search associated with the level below the selected node to determine a starting node associated with the level, an ending node associated with the level, and if there are any nodes between the starting node and the ending node. The primary directory differ may divide the portion of the file directory tree structure into sub-portions based on the nodes associated with the level. The portion of the file directory tree structure may be further divided at any of the nodes associated with the level. In other embodiments, a secondary directory differ may divide its own assigned portion of the file directory tree structure using the steps described above. A directory differ may further subdivide an assigned portion of the file directory tree structure prior to traversing the assigned portion.

In other embodiments, a file directory tree structure is dynamically divided after a portion of the file directory tree structure has been traversed. In some embodiments, a primary directory differ may select one of the active directory differs, stop a traversal of the file directory tree structure portion associated with the selected active directory differ, divide the portion associated with the selected directory differ into a plurality of sub-portions, resume the traversal of the file directory tree structure portion associated with the selected active directory differ, and initiate a traversal of the new file directory tree sub-portions associated with the corresponding differs. In other embodiments, an active directory differ may be configured to divide its assigned portion of the file directory tree structure into a plurality of sub-portions. A directory differ assigned to a sub-portion may further subdivide an assigned portion of the file directory tree structure prior to traversing the assigned sub-portion.

A portion of the file directory tree structure associated with a directory differ may be divided by determining a root node associated with a directory differ, determine a level below the root node associated with the directory differ, perform a breadth first search associated with the level below the root node associated with the directory differ to determine a starting node associated with the level, an ending node associated with the level, and if there are any nodes between the starting and ending node. The portion of the file directory tree structure may be further divided at any of the nodes associated with the level. In other embodiments, a portion of the file directory tree structure associated with a directory differ may be divided by selecting a node associated with a directory differ, determine a level below the selected node associated with the directory differ, perform a breadth first search associated with the level below the selected node associated with the directory differ to determine a starting node associated with the level, an ending node associated with the level, and if there are any nodes between the starting and ending node. The portion of the file directory tree structure may be further divided at any of the nodes associated with the level.

At 406, one or more consolidated checkpoint data stores are generated. Each directory walker may be configured to report its traversal progress to an associated directory differ and each directory differ may be configured to generate a corresponding checkpoint data store based on the information received from an associated directory walker. The corresponding checkpoint data store may store the one or more nodes traversed by a directory walker. The checkpoint data stores associated with each of the directory walkers may be merged into one or more consolidated checkpoint data stores. The one or more consolidated checkpoint data stores include node information associated with the file directory tree structure.

In some embodiments, the checkpoint data stores are consolidated into a global checkpoint data store. The global checkpoint data store may include split information that indicates which nodes of the file directory tree structure were used to divide the file directory tree structure into a plurality of portions.

In other embodiments, the checkpoint data stores are consolidated into a plurality of checkpoint data stores where the number of the plurality of checkpoint data stores is less than the number of checkpoint data stores associated with each of the directory walkers. A file directory tree structure may be divided into a plurality of portions, each portion having approximately the same number of nodes (e.g., each portion having a number of nodes within a threshold number of nodes). One of the consolidated checkpoint data stores may correspond to one of the portions.

At 408, data associated with the file directory tree structure is requested. The storage system may provide to the primary system a request for the data associated with the file directory tree structure.

At 410, the requested data is received and stored. In response to the request, the primary system may provide to the storage system the data associated with the file directory tree structure. The storage system may receive and store the data across one or more storage nodes of the secondary storage system. The storage system may use the received data to generate a backup version of the file directory tree structure of the selected storage snapshot.

Figure 4B:
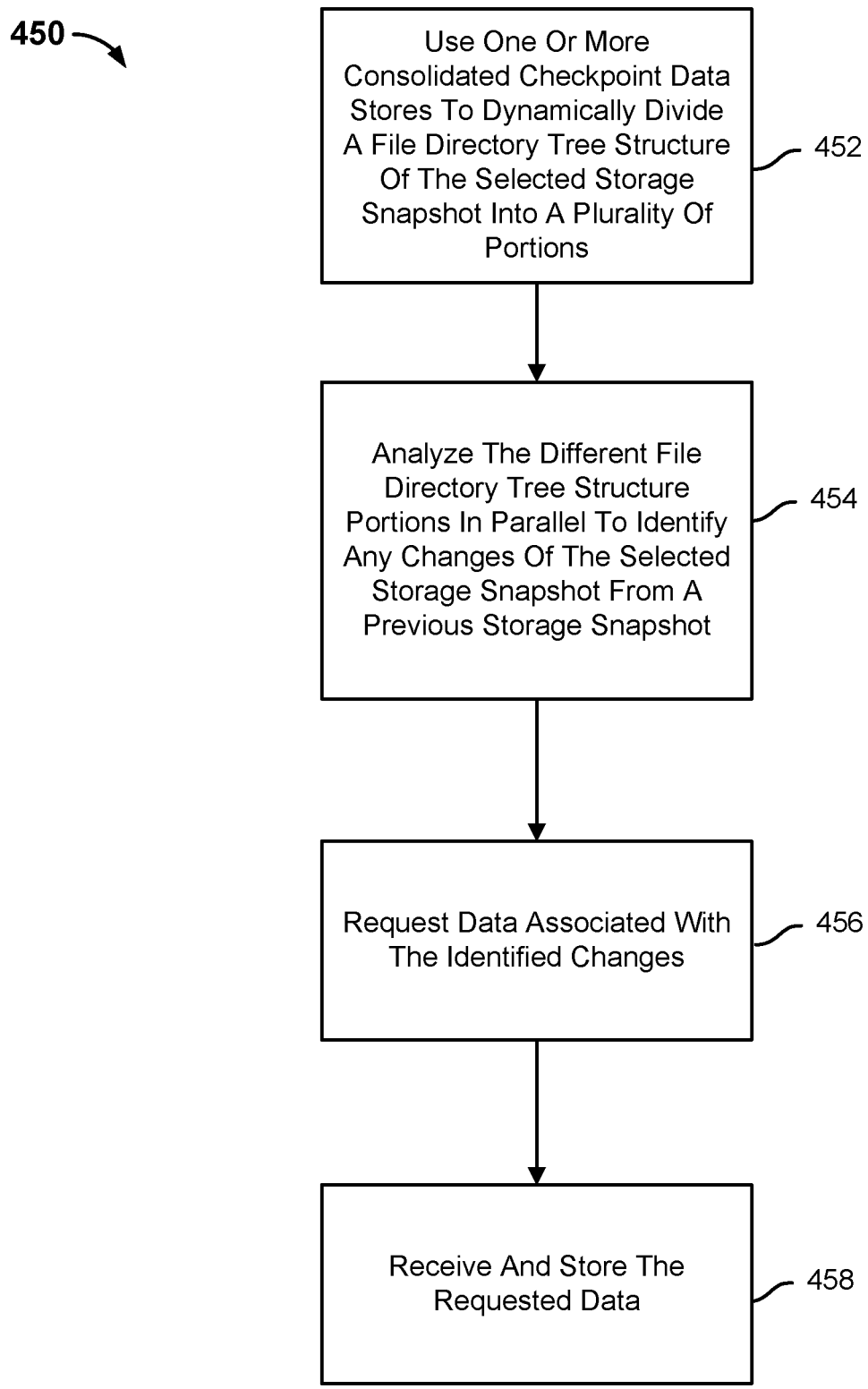
FIG. 4B is a flow chart illustrating a process for traversing file directory tree structures in parallel in accordance with some embodiments.

FIG. 4B is a flow chart illustrating a process for traversing file directory tree structures in parallel in accordance with some embodiments. Process 450 may be performed by a storage system, such as storage system 112. Process 450 may be implemented to perform an incremental backup of a file directory tree structure.

At 452, one or more consolidated checkpoint data stores are used to dynamically divide a file directory tree structure of the selected storage snapshot into a plurality of portions. The one or more consolidated checkpoint data stores may correspond to a first version of a file directory tree structure.

The one or more consolidated checkpoint data stores may be a global checkpoint data store. The global checkpoint data store may include split information that indicates which nodes of the file directory tree structure were used to split the file directory tree structure into a plurality of portions. A second version of the file directory tree structure may be divided based on the split information included in the global checkpoint data store. For example, the second version of the file directory tree structure may be divided at the same nodes included in the split information.

In other embodiments, each of the consolidated checkpoint data stores corresponds to a portion of the first version of the file directory tree structure. The second version of the file directory tree structure may be divided into a plurality of portions, such that each portion corresponds to one of the plurality of consolidated checkpoint data stores.

At 454, the different file directory tree structure portions are analyzed in parallel to identify any changes of the selected storage snapshot from a previous storage snapshot. The second version of the file directory tree structure may be associated with a primary directory differ. The primary directory differ may be configured to orchestrate a traversal of the second version of the file directory tree structure.

After traversal of the second version of the file directory tree structure has commenced, the primary directory differ may dynamically divide a file directory tree structure into a plurality of portions and assign a corresponding directory differ to each of the plurality of portions. A primary directory differ may select one of the active directory differs, stop a traversal of the file directory tree structure portion associated with the selected active directory differ, divide the portion associated with the selected directory differ into a plurality of sub-portions, assign a corresponding differ to the plurality of sub-portions, resume the traversal of the file directory tree structure portion associated with the selected active directory differ, and initiate a traversal of the new file directory tree sub-portions associated with the corresponding differs. A directory differ may further subdivide an assigned sub-portion of the file directory tree structure prior to traversing the assigned sub-portion.

Each directory walker may be configured to report its traversal progress to an associated directory differ and each directory differ may be configured to generate a corresponding checkpoint data store based on the information received from an associated directory walker. The directory differ may compare the node information provided from a directory walker to node information included in a consolidated checkpoint data store associated with the portion of the file directory tree structure assigned to the directory differ to identify any changes between the second version of the file directory tree structure and the first version of the file directory tree structure.

In some embodiments, the file directory tree structure has changed more than a threshold amount between a first version of the file directory tree structure and a second version of the file directory tree structure. For example, the plurality of portions of the file directory tree structures do not include approximately the same number of nodes (e.g., a threshold number of nodes have been either added or removed from a portion of a file directory tree structure). When comparing the node information reported by a corresponding directory walker with node information included in an associated consolidated checkpoint data store, a directory differ may determine that a directory walker traversing the second version of the file directory tree structure is encountering a threshold number of new nodes or that a threshold number of nodes have been removed from the file directory tree structure between the first and second versions of the file directory tree structure. In response to receiving the notification, the primary directory differ may determine that the file directory tree structure needs to be re-divided because the portions of the file directory tree structure are unbalanced. Having unbalanced portions of the file directory tree structure may cause one or more directory walkers to finish traversing their assigned portions before other directory walkers. A traversal of the second version of the file directory tree structure may be stopped, the second version of the file directory tree structure may be re-divided into a plurality of new portions, and the second version of the file directory tree structure may be traversed using the plurality of new portions. The second version of the file directory tree structure may be compared to the first version of the file directory tree structure using the steps of process 480 of FIG. 4C.

At 456, data associated with the identified changes is requested. The storage system may provide to the primary system a request for the data associated with the nodes that have been added, deleted, or modified between the selected storage snapshot and the storage snapshot corresponding to the last backed up version of the file directory tree structure. These nodes correspond to the nodes of the file directory tree structure that have not been backed up.

At 458, the requested data is received and stored. In response to the request, the primary system may provide to the storage system the data associated with the nodes that have been added, deleted, or modified between the selected storage snapshot and the storage snapshot corresponding to the last backed up version of the file directory tree structure. The storage system may receive and store the data across one or more nodes of the secondary storage system. The storage system may store one or more versions of the file directory tree structure. The storage system may use the received data to generate a backup version of the file directory tree structure of the selected storage snapshot.

Figure 4C:
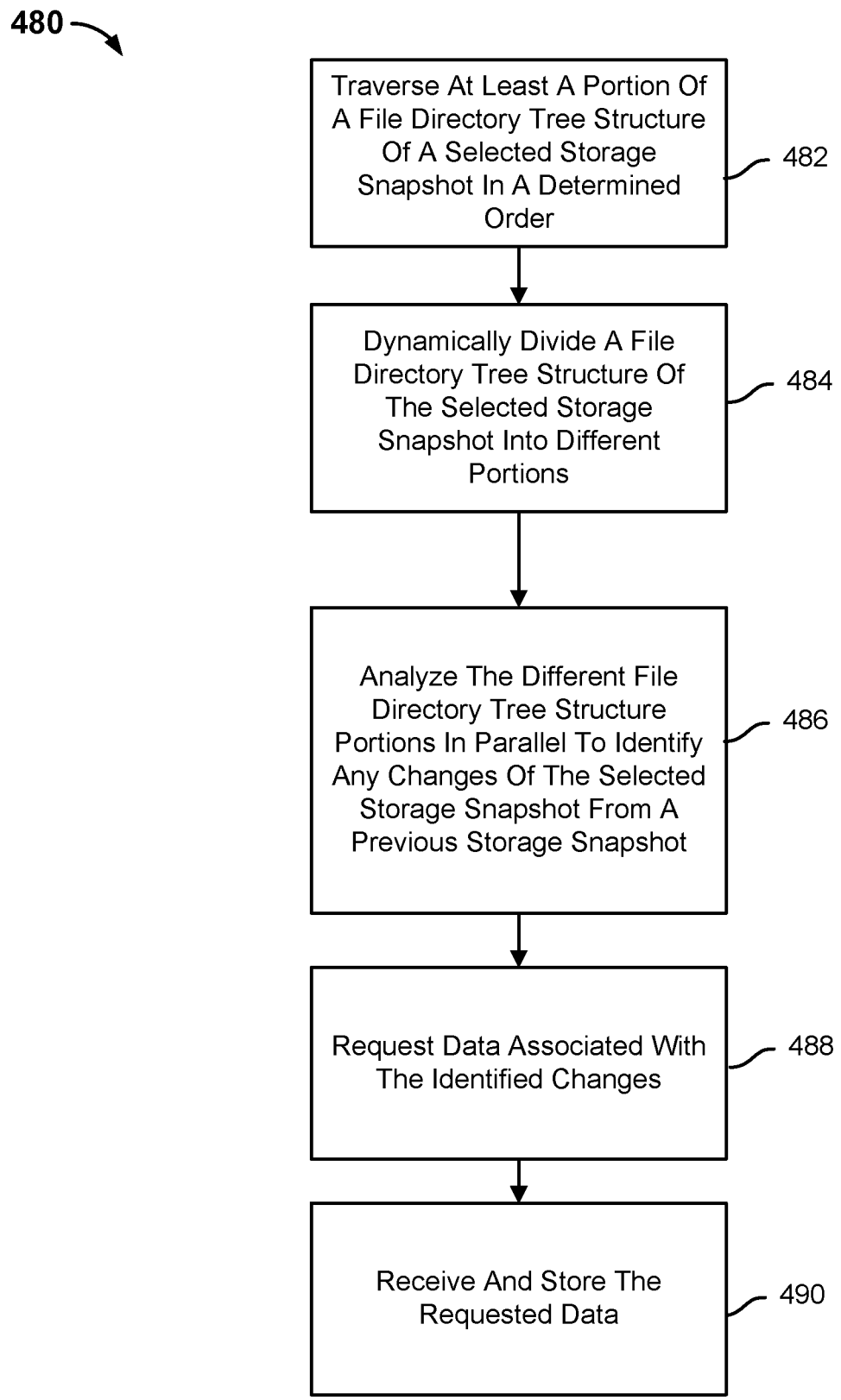
FIG. 4C is a flow chart illustrating a process for traversing file directory tree structures in parallel in accordance with some embodiments.

FIG. 4C is a flow chart illustrating a process for traversing file directory tree structures in parallel in accordance with some embodiments. Process 480 may be performed by a storage system, such as storage system 112. Process 480 may be implemented to perform an incremental backup of a file directory tree structure.

At 482, at least a portion of a file directory tree structure of a selected storage snapshot is traversed in a determined order.

A primary system may include a file system that uses a file directory tree structure to organize the directory, sub-directories, and files. The primary system may perform a snapshot of the file directory tree structure and store the file directory tree structure snapshot as a storage snapshot. A storage snapshot may correspond to a version of the file directory tree structure at a particular moment in time. A storage snapshot may store all of the nodes associated with the file directory tree structure.

The primary storage system may be configured to perform an incremental backup of the file directory tree structure. An incremental backup of the file directory tree structure includes data associated with the nodes of the file directory tree structure that has not been backed up.

The primary system may store a plurality of storage snapshots corresponding to different versions of the file directory tree structure. A storage system may remotely access the plurality of storage snapshots and select one of the storage snapshots. For example, the selected storage snapshot may correspond to a version of the file directory tree structure that was not backed up to the secondary storage system. The primary system may store a storage snapshot that corresponds to a last backed up version of the file directory tree structure. The selected storage snapshot may be compared to the storage snapshot that corresponds to the last backed up version of the file directory tree structure to determine the nodes of the version of the file directory tree structure that have not been backed up. In other embodiments, the file directory tree structure of the storage snapshot that corresponds to the last backed up version of the file directory tree structure is the selected storage snapshot and steps 482, 484, 486, 488, 490 are performed with respect to the storage snapshot that corresponds to a version of the file directory tree structure that has not been backed up.

The file directory tree structure associated with the selected snapshot may be comprised of a large number of nodes (e.g., millions). The file directory tree structure may be comprised of a plurality of levels (e.g., root level, one or more levels of intermediate nodes, a leaf node level). It may take a long period of time to traverse the entire file directory tree structure and determine a location for all of the nodes. Instead, at least a portion of the file directory tree structure associated with the selected snapshot may be traversed to determine the nodes associated with a plurality of upper levels associated with the file directory tree structure associated with the selected snapshot and the plurality of nodes included in the plurality of upper levels. For example, a primary directory differ may perform a breadth first search associated with the level below the root node of the file directory tree structure associated with the selected snapshot to determine the plurality of nodes associated with the level and the number of nodes associated with the level.

At 484, a file directory tree structure of the selected storage snapshot is dynamically divided into different portions. The file directory tree structure of the selected storage snapshot may be dynamically divided after traversal of the file directory tree structure has commenced based on one or more factors (e.g., amount of resources available, the actual time needed to traverse a portion of a file directory tree structure is taking more time than an expected amount of time needed to traverse the portion of the file directory tree structure, one of the directory differs and associated directory walkers has finished traversing their corresponding portion of the file directory tree structure, etc.). The file directory tree structure of the selected storage snapshot may be dynamically divided any time after traversal of the file directory tree structure has commenced and before the entire file directory tree structure has been traversed.

The file directory tree structure may be initially divided based on the number of nodes associated with the level below the root node of the file directory tree. The number of nodes associated with the level may be n. The file directory tree structure may be divided into 2 to n portions.

The primary directory differ may be configured to orchestrate a traversal of the file directory tree structure of the selected storage snapshot and a traversal of the file directory tree structure of the storage snapshot that corresponds to the last backed up version of the file directory tree structure to determine one or more differences between the first and second versions of the file directory tree structure. The one or more differences may correspond to data associated with the file directory tree structure that was not previously backed up.

The primary directory differ may assign a corresponding directory differ to each of the plurality of portions. Each directory differ is associated with a first directory walker and a second directory walker. The first directory walker may be configured to traverse an assigned portion of the first version of the file directory tree structure and the second directory walker may be configured to traverse the assigned portion of the second version of the file directory tree structure. A directory differ may further subdivide an assigned portion of the file directory tree structure prior to traversing the assigned portion.

The primary directory differ may dynamically divide the file directory tree structure as the first and second versions of the file directory tree structure after a traversal of the first and second versions of the file directory tree structure has commenced. A primary directory differ may select one of the active directory differs, stop a traversal of the file directory tree structure portion associated with the selected active directory differ, divide the portion associated with the selected directory differ into a plurality of sub-portions, assign a corresponding differ to the plurality of sub-portions, resume the traversal of the file directory tree structure portion associated with the selected active directory differ, and initiate a traversal of the new file directory tree sub-portions associated with the corresponding differs.

In some embodiments, to divide the file directory tree structure of the selected storage snapshot, the primary directory differ may determine a root node associated with the file directory tree structure of the selected storage snapshot, determine a level below the root node associated with the primary directory differ, and perform a breadth first search associated with the level below the root node associated with the primary directory differ to determine the plurality of nodes associated with the level. The file directory tree structure may be divided based on the number of nodes associated with the level. The number of nodes associated with the level may be n. The file directory tree structure may be divided into 2 to n portions. The file directory tree structure may be divided at each node of the level. For example, for a level having four nodes, a first node of the level and its children nodes may be associated with a corresponding portion of the file directory, a second node of the level and its children nodes may be associated with a corresponding portion of the file directory, a third node of the level and its children nodes may be associated with a corresponding portion of the file directory, and a fourth node of the level and its children nodes may be associated with a corresponding portion of the file directory.

The primary directory differ may further divide the file directory tree structure of the selected storage snapshot into a plurality of other portions. The primary directory differ may select a node that has a plurality of children nodes, determine a level below the selected node associated with the primary directory differ, and perform a breadth first search associated with the level below the selected node associated with the primary directory differ to determine the plurality of nodes associated with the level. The file directory tree structure may be divided based on the number of nodes associated with the level. The number of nodes associated with the level may be n. The file directory tree structure may be divided into 2 to n portions.

Each portion of the file directory tree structure of the selected storage snapshot has an associated directory differ. For example, a first portion of the file directory tree structure of the selected storage snapshot may be associated with the primary directory differ, a second portion of the file directory tree structure of the selected storage snapshot may be associated with a corresponding secondary directory differ, a third portion of the file directory tree structure of the selected storage snapshot may be associated with a corresponding third directory differ, . . . , and an nth portion of the file directory tree structure of the selected storage snapshot may be associated with a corresponding nth directory differ.

Each directory differ is associated with two directory walkers. A first directory walker associated with a directory differ may be configured to traverse a portion of the file directory tree structure of the selected storage snapshot and a second directory walker associated with the directory differ may be configured to traverse a portion of the file directory tree structure of the storage snapshot that corresponds to the last backed up version of the file directory tree structure. A directory walker is associated with a directory tuple. The directory tuple indicates the portion of the file directory tree structure that the directory walker is configured to traverse. The directory tuple may be expressed as: (root node, starting node, ending node). The two directory walkers associated with a directory differ may be configured to be associated with the same directory tuple. A directory walker associated with a first directory differ may not traverse one or more nodes of a file directory tree structure that a directory walker associated with a second directory differ is configured to traverse. The directory tuple associated with a directory walker may prevent this from occurring. An accurate representation of file directory tree structure 104 may not be able to be determined in the event directory walkers associated with different directory differs were configured to traverse the same nodes. The primary directory differ may maintain a data structure that associates all of the directory walkers with a corresponding directory tuple. A secondary directory differ may maintain a data structure that associates its corresponding directory walkers with a directory tuple.

Instead of using a single directory walker to traverse the file directory tree structure, using a plurality of directory walkers to traverse corresponding portions of the file directory tree structure may reduce the amount of time needed to traverse the file directory tree structures.

In some embodiments, the primary directory differ updates its data structure that associates all of the directory walkers with a corresponding directory tuple based on the sub-portions. In other embodiments, the directory differs assigned to the sub-portions are configured to maintain a data structure that associates its corresponding directory walkers with a directory tuple.

At 486, the different file directory tree structure portions are analyzed in parallel to identify any changes of the selected storage snapshot from a previous storage snapshot.

Each directory walker may be configured to provide checkpoint information to its corresponding directory differ. The checkpoint information is comprised of node information that indicates the directory walker has or is traversing the node. A directory walker may be configured to provide the checkpoint information after the directory walker has traversed a node. In other embodiments, a directory walker may be configured to provide the checkpoint information while the directory walker is traversing the node. In other embodiments, a directory walker may be configured to provide the checkpoint information after a couple of nodes have been traversed.

A directory differ may use the checkpoint information to generate a checkpoint data store. The checkpoint data store may include node information from the portions of the file directory tree structures being traversed by the directory walkers associated with the directory differ. The directory differ may use the checkpoint data store to determine one or more differences between two file directory tree structures. A directory walker may be configured to traverse a portion of a file directory tree structure using a preorder traversal with a lexicographical ordering of children nodes. In the event a portion of a file directory tree structure has not changed between file directory tree structure versions, not only is the node information provided by both directory walkers associated with a directory differ the same, but the order of the node information is also the same. In the event a portion of a file directory tree structure has changed between file directory tree structure versions, the one or more nodes that have been added, deleted, or modified may be easily identified based on an order of the nodes traversed by a directory walker.

In some embodiments, each secondary directory differ is configured to provide its corresponding checkpoint data store to a primary directory differ. The primary directory differ may determine the one or more differences between the selected storage snapshot and the storage snapshot corresponding to the last backed up version of the file directory tree structure.

In other embodiments, each secondary directory differ is configured to provide information associated with the one or more nodes that have been added, deleted, or modified between the selected storage snapshot and the storage snapshot corresponding to the last backed up version of the file directory tree structure. The primary directory differ may combine the node information received from each secondary directory differ to determine all of the nodes that have been added, deleted, or modified between the selected storage snapshot and the storage snapshot corresponding to the last backed up version of the file directory tree structure.

At 488, data associated with the identified changes is requested. The storage system may provide to the primary system a request for the data associated with the nodes that have been added, deleted, or modified between the selected storage snapshot and the storage snapshot corresponding to the last backed up version of the file directory tree structure. These nodes correspond to the nodes of the file directory tree structure that have not been backed up.

At 490, the requested data is received and stored. In response to the request, the primary system may provide to the storage system the data associated with the nodes that have been added, deleted, or modified between the selected storage snapshot and the storage snapshot corresponding to the last backed up version of the file directory tree structure. The storage system may receive and store the data across one or more nodes of the secondary storage system. The storage system may store one or more versions of the file directory tree structure. The storage system may use the received data to generate a backup version of the file directory tree structure of the selected storage snapshot.

Figure 5:
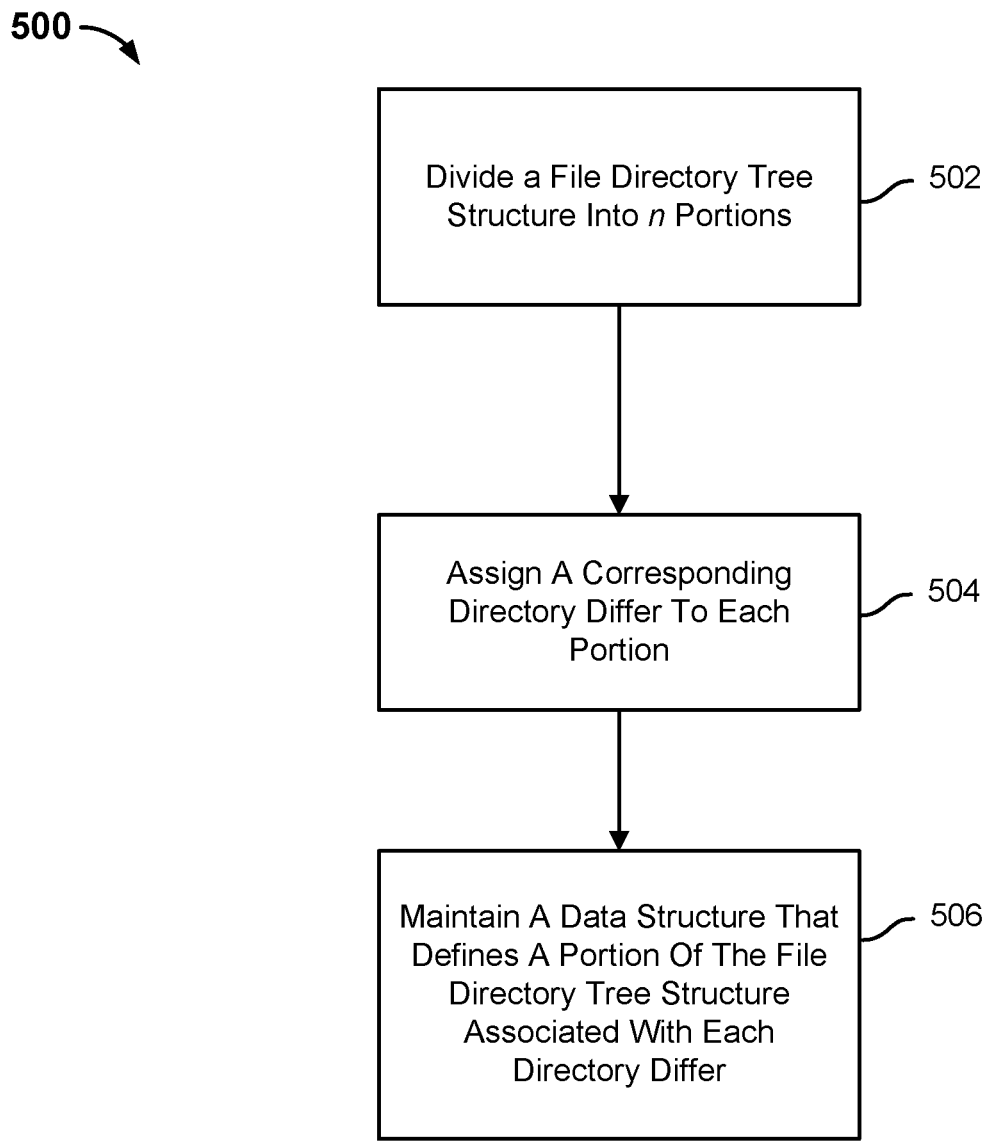
FIG. 5 is a flow chart illustrating a process for traversing a file directory tree structure in accordance with some embodiments.

FIG. 5 is a flow chart illustrating a process for traversing a file directory tree structure in accordance with some embodiments. Process 500 may be performed by a storage system, such as storage system 112. In some embodiments, process 500 is used to perform some or all of step 404 of process 400 or some or all of step 484 of process 480.

At 502, a file directory tree structure is split into n portions. In some embodiments, the file directory tree structure corresponds to a last backed up version of the file directory tree structure. In other embodiments, the file directory tree structure corresponds to a version of the file directory tree structure that has not been backed up. In some embodiments, a size of each portion is approximately the same size. For example, each portion may have the same number of nodes within a threshold range.

In some embodiments, the file directory tree structure is divided based in part on a root node of the file directory tree structure. A breadth first search associated with a level below the root node of the file directory tree structure may be performed to determine the plurality of nodes associated with the level. The file directory tree structure may be divided based on the number of nodes associated with the level. The number of nodes associated with the level may be n. The file directory tree structure may be divided into 2 to n portions.

Other portions of the file directory tree structure may be divided based on a selected node that has children nodes. A breadth first search associated with the level below the selected node may be performed to determine the plurality of nodes associated with the level below the selected node.

At 504, a corresponding directory differ is assigned to each portion.

For a full backup, each directory differ is associated with one directory walker. Each corresponding directory differ may be configured to orchestrate a traversal of the assigned portion of the file directory tree structure of a storage snapshot that corresponds to a version of the file directory tree structure that has not been backed up.

For an incremental backup, each directory differ is associated with two directory walkers. Each corresponding directory differ may be configured to orchestrate a traversal of the assigned portion of the file directory tree structure of a storage snapshot that corresponds to a version of the file directory tree structure that has not been backed up and a traversal of the assigned portion of the file directory tree structure of the storage snapshot that corresponds to the last backed up version of the file directory tree structure. A first directory walker associated with a directory differ may be configured to traverse a portion of the file directory tree structure of a storage snapshot that corresponds to a version of the file directory tree structure that has not been backed up and a second directory walker associated with the directory differ may be configured to traverse a portion of the file directory tree structure of the storage snapshot that corresponds to the last backed up version of the file directory tree structure.

At 506, a data structure that defines a portion of the directory tree structure associated with each differ is maintained. Each directory walker associated with a directory differ may be configured to traverse a specific portion of the directory tree structure. The specific portion of the directory tree structure may be configured by a directory tuple. The directory tuple may be expressed as: (root node, starting node, ending node). In other embodiments, the directory tuple is expressed as (root node, starting node, ending node, depth level). The two directory walkers associated with a directory differ may be associated with the same directory tuple. A directory walker associated with a first directory differ may not traverse one or more nodes of a file directory tree structure that a directory walker associated with a second directory differ is configured to traverse. The primary directory differ may maintain a data structure that associates all of the directory differs and associated directory walkers with a corresponding directory tuple. The directory tuples are non-overlapping. A secondary directory differ may maintain a data structure that associates its corresponding directory walkers with a directory tuple.

Figure 6:
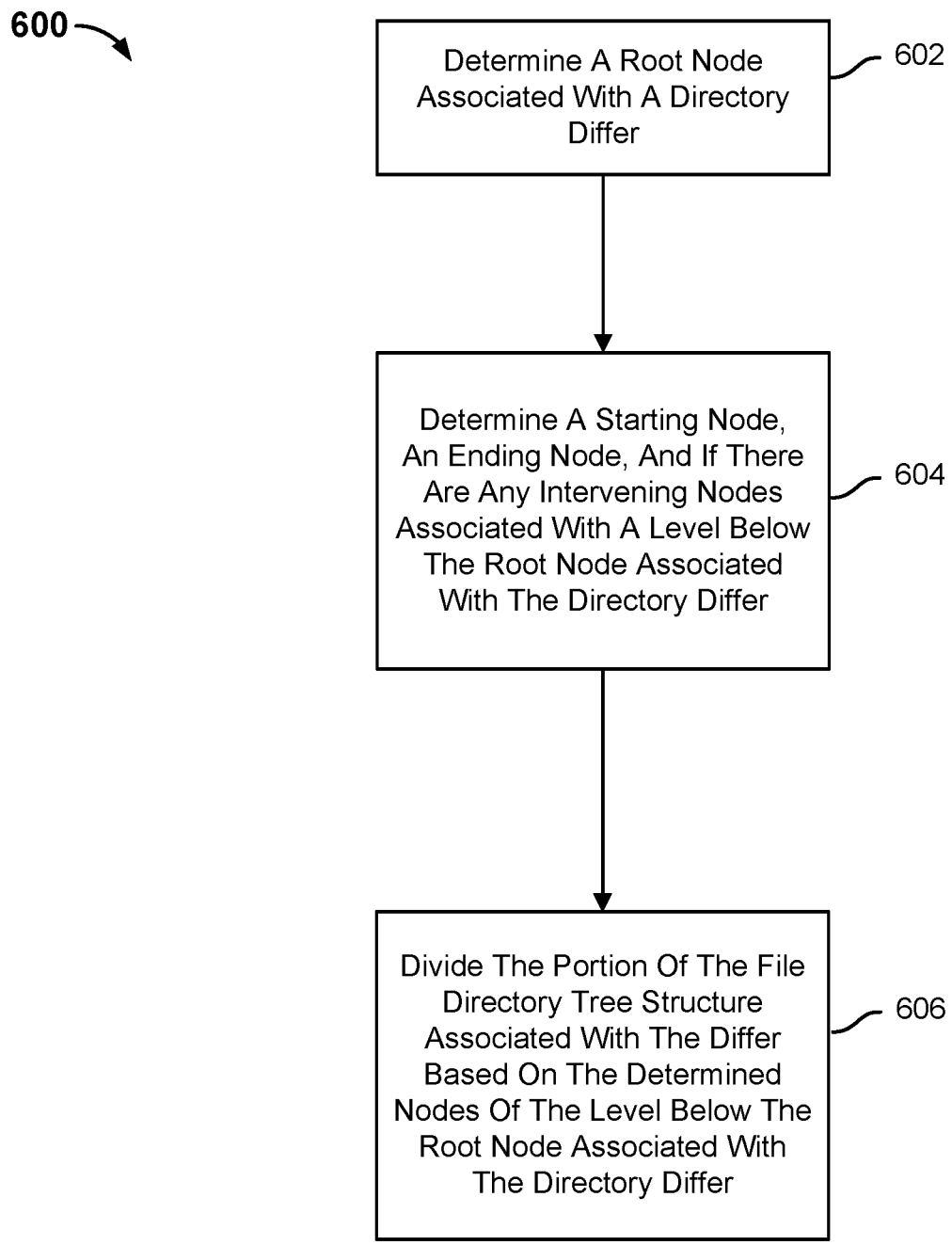
FIG. 6 is a flow chart illustrating a process for dividing a file directory tree structure in accordance with some embodiments.

FIG. 6 is a flow chart illustrating a process for dividing a file directory tree structure in accordance with some embodiments. Process 600 may be performed by a storage system, such as storage system 112. In some embodiments, process 600 is used to perform some or all of step 502 of process 500 or some or all of step 404 of process 400.

At 602, a root node associated with a directory differ is determined. The directory differ may be a primary directory differ or a secondary directory differ.

At 604, a starting node, an ending node, and if there are any nodes between the starting node and the ending node associated with a level below the root node associated with the directory differ are determined. A breadth first search associated with the level below the root node associated with the directory differ may be performed to determine the plurality of nodes associated with the level below the root node associated with the directory differ. In some embodiments, the level below the root node is comprised of a starting node, an ending node, and no intervening nodes between the starting node and the ending node. In other embodiments, the level below the root node is comprised of a starting node, an ending node, and one or more intervening nodes between the starting node and the ending node.

At 606, the portion of the file directory tree structure associated with the directory differ is divided into a plurality of sub-portions based on the determined nodes of the level below the root node associated with the directory differ. The number of nodes associated with the level may be n. The file directory tree structure may be divided into 2 to n portions.

Figure 7:
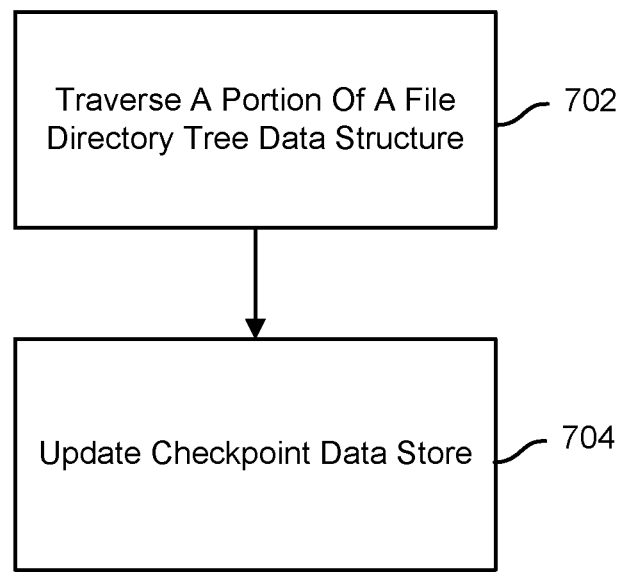
FIG. 7 is a flow chart illustrating a process for updating a checkpoint data store associated with a file directory tree structure in accordance with some embodiments.

FIG. 7 is a flow chart illustrating a process for updating a checkpoint data store associated with a file directory tree structure in accordance with some embodiments. Process 700 may be performed by a storage system, such as storage system 112. In some embodiments, process 700 is implemented to perform some of step 406 of process 400.

At 702, a portion of a file directory tree data structure is traversed. A directory walker may traverse a portion of a file directory tree data structure using a preorder traversal with lexicographical ordering of children nodes.

At 704, a checkpoint data store is updated. A checkpoint data store is configured to store the one or more nodes traversed by a directory walker. The checkpoint data store may be stored as a file, in cache, in memory, etc. A directory walker may be configured to provide checkpoint information to its corresponding directory differ. The checkpoint information is comprised of node information that indicates the directory walker has or is traversing the node. A directory walker may be configured to provide the checkpoint information after the directory walker has traversed a node. In other embodiments, a directory walker is configured to provide the checkpoint information while the directory walker is traversing the node. In other embodiments, a directory walker is configured to provide the checkpoint information after a couple of nodes have been traversed.

A directory differ may use the checkpoint information to generate a checkpoint data store. The checkpoint data store may include node information from the portions of the file directory tree structures being traversed by the directory walkers associated with the directory differ. The directory differ may use the checkpoint data store to determine one or more differences between two file directory tree structures.

Figure 8:
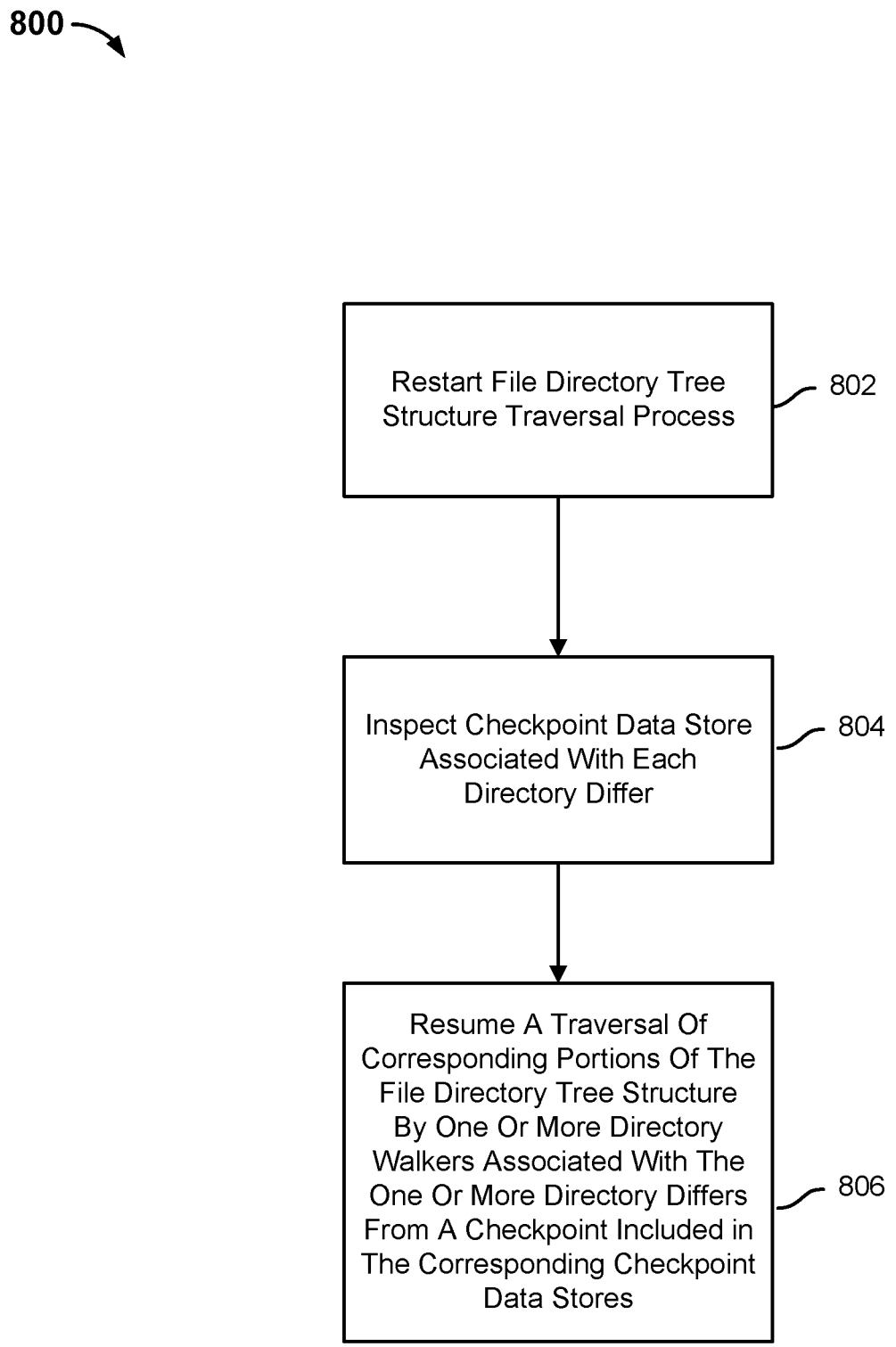
FIG. 8 is a flow chart illustrating a process for resuming a traversal of a file directory tree structure in accordance with some embodiments.

FIG. 8 is a flow chart illustrating a process for resuming a traversal of a file directory tree structure in accordance with some embodiments. Process 800 may be performed by a storage system, such as storage system 112. In some embodiments, process 800 is implemented to perform some of step 406 of process 400.

At 802, a process of a file directory tree structure traversal is restarted. A storage system may use a plurality of directory differs and associated directory walkers to traverse a version of a last backed up file directory tree structure and a version of the file directory tree structure that was not backed up (e.g., to perform an incremental backup of the file directory tree structure). In other embodiments, a storage system may use a plurality of directory differs and associated directory walkers to traverse a version of the file directory tree structure that was not backed up (e.g., to perform a full backup of the file directory tree structure). The traversal of the file directory tree structures may not be completed for one or more reasons. For example, the primary system that is associated with the file directory tree structures or a storage system configured to back up the primary system may go offline (e.g., system crash).

At 804, a checkpoint data store associated with each directory differ is inspected. A directory differ may store a checkpoint data store that includes checkpoint information associated with a directory walker. The checkpoint information may indicate the one or more nodes of a portion of the file directory tree structure that has already been traversed by a directory walker associated with the directory differ.

At 806, a traversal of corresponding portions of the file directory tree structure is resumed by one or more directory walkers associated with one or more directory differs from a checkpoint included in the corresponding checkpoint data stores.

Figure 9:
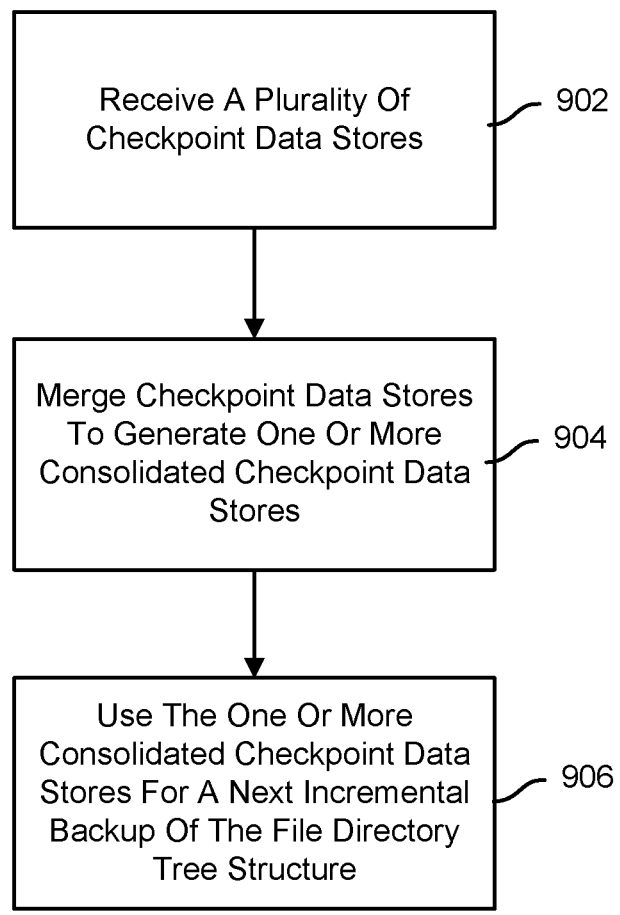
FIG. 9 is a flow chart illustrating a process for generating one or more consolidated checkpoint data stores in accordance with some embodiments.

FIG. 9 is a flow chart illustrating a process for generating one or more consolidated checkpoint data stores in accordance with some embodiments. Process 900 may be performed by a storage system, such as storage system 112.

At 902, a plurality of checkpoint data stores is received. Each secondary directory differ may provide its corresponding checkpoint data store to a primary directory differ. The primary directory differ may maintain its own checkpoint data store. Each checkpoint data store is comprised of checkpoint information associated with a directory walker. The checkpoint information indicates the one or more nodes of a portion of the file directory tree structure that have been traversed by a directory walker associated with the directory differ.

At 904, the plurality of checkpoint data stores are merged to generate one or more consolidated checkpoint data stores. The primary directory differ may combine its own checkpoint data store with the secondary directory differ checkpoint data store to generate a global checkpoint data store. The global checkpoint data store may indicate all of the nodes associated with a file directory tree structure. The global checkpoint data store may include split information that indicates which nodes of the file directory tree structure were used to divide the file directory tree structure into a plurality of portions.

In other embodiments, the plurality of checkpoint data stores are merged to generate a plurality of consolidated checkpoint data stores where the number of the plurality of consolidated checkpoint data stores is less than the number of checkpoint data stores associated with each of the directory differs. Each consolidated checkpoint data store may correspond to a portion of the file directory tree structure and include approximately the same number of nodes (e.g., each portion having a number of nodes within a threshold number of nodes). For example, a file directory tree structure may have been dynamically divided into 32 portions during a first traversal. A next traversal of the file directory tree structure may divide the file directory tree structure into 8 portions. The corresponding checkpoint data stores associated with the 32 portions may be consolidated into 8 checkpoint data stores, one for each portion of a next traversal of the file directory tree structure.

The number of active directory differs may dynamically change during a traversal of a file directory tree structure. In some embodiments, the number of active directory differs is modified based on available resources of the primary system and/or the secondary storage system. In other embodiments, the number of active directory differs is modified in response to a user input. The number of active directory differs may increase or decrease during a traversal of the file directory tree structure. As the file directory tree structure is being traversed and subdivided, the portions of the file directory tree structure may become unbalanced (e.g., each portion of the file directory tree structure does not include the same number of nodes within a threshold number of nodes). The plurality of checkpoint data stores may be consolidated to generate a plurality of balanced file directory tree structure portions (e.g., each portion has approximately the same number of nodes) for a subsequent traversal of the file directory tree structure. Configuring each portion of the file directory tree structure to be balanced may help to ensure that all of the processors assigned to traverse the file directory tree structure are busy during the subsequent traversal.

At 906, the one or more consolidated checkpoint data stores are used for a next incremental backup of the file directory tree structure. Instead of traversing a portion of a storage snapshot to determine where to divide a next version of the file directory tree structure at step 482 of process 480, the one or more consolidated checkpoint data stores may be used to determine where to divide the file directory tree structure. For example, the global checkpoint data store may include a record of all the nodes of the file directory tree structure, a location of the nodes, and information of where the file directory tree structure was divided. The next incremental backup of the file directory tree structure may be divided at the same locations as the previous incremental backup based on the information of where the file directory tree structure was divided.

The plurality of consolidated checkpoint data stores may be used to divide a next version of the file directory tree structure because each consolidated checkpoint data store corresponds to a portion of the next version of the file directory tree structure.

Using the one or more consolidated checkpoint data stores may reduce the amount of resources needed to determine the differences between a first version of a file directory tree structure (e.g., an already backed up version) and second version of a file directory tree structure (a version that has not been backed up) because instead of having a directory differ that is associated with a first directory walker configured to traverse a portion of the first version of the file directory tree structure and a second directory walker configured to traverse a portion of the second version of the file directory tree structure, the directory differ may be associated with a single directory walker that is configured to traverse a portion of the second version of the file directory tree structure since the node information associated with the first version of the file directory tree structure is already known.

Figure 10:
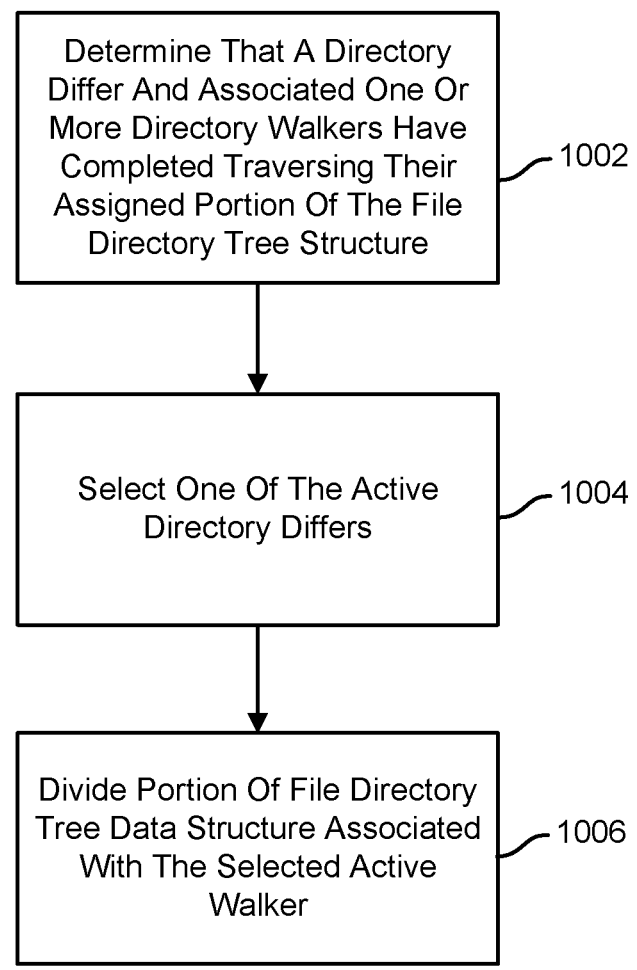
FIG. 10 is a flow chart illustrating a process for dynamically dividing a file directory tree structure in accordance with some embodiments.

FIG. 10 is a flow chart illustrating a process for dynamically dividing a file directory tree structure in accordance with some embodiments. Process 1000 may be performed by a storage system, such as storage system 112. In some embodiments, process 1000 is implemented to perform some of step 404 of process 400, some or all of step 452 of process 450, or some or all of step 484 of process 480. Process 1000 may be implemented after traversal of the file directory tree structure has commenced and before the entire file directory tree structure has been traversed.

At 1002, it is determined that one of the directory differs and its associated one or more directory walkers have completed traversing their assigned portion of the file directory tree structure. A plurality of directory walkers may be configured to traverse corresponding portions of a file directory tree structure. Each portion may be associated with a different number of nodes. A directory walker associated with a portion of the file directory tree structure that has fewer nodes than other portions may finish traversing the portion before the other directory walkers finish traversing their corresponding portions.

At 1004, one of the active directory differs is selected. A primary directory differ or a main coordinator may determine the one or more directory differs that are still active. In some embodiments, the active directory differ is selected based on a remaining amount of the file directory tree structure needed to be traversed by the directory walkers associated with a directory differ. In other embodiments, the active directory differ is randomly selected from the active directory differs.

At 1006, a portion of the file directory tree structure associated with the selected active directory differ is divided. The portion of the file directory tree structure associated with the selected active differ may be divided based on a last node traversed by a directory walker associated with the selected active differ. The portion to be divided may correspond to the portion of the file directory tree structure that has yet to be traversed by a directory walker associated with the selected directory differ. The portion of a file directory tree structure associated with the selected active walker may be divided by determining a last node traversed by a directory walker associated with the selected active differ, determining a level below the last traversed node, and performing a breadth first search associated with the level below the last traversed node to determine the plurality of nodes associated with the level and the number of nodes associated with the level. The file directory tree structure may be divided based on the number of nodes associated with the level. The number of nodes associated with the level may be n. The portion of the file directory tree structure associated with the selected active directory differ may be divided into 2 to n portions where any of the nodes of the level may be used to divide the portion of the file directory tree structure.

An existing directory walker may be assigned to a first sub-portion of the divided portion and one or more directory walkers may be assigned to the one or more other sub-portions of the divided portion.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
remotely accessing a selected storage snapshot that is stored on a primary system;
dynamically dividing, by a storage system, a file directory tree structure of the selected storage snapshot into different portions, wherein a corresponding walker is assigned to each of the different portions;
analyzing, by the storage system, a plurality of the different file directory tree structure portions in parallel to identify any changes of the selected storage snapshot from a previous storage snapshot, wherein analyzing each of the plurality of the different file directory tree structure portions includes traversing and comparing a corresponding file directory tree structure portion of the selected storage snapshot with a corresponding portion of a file directory tree structure of the previous storage snapshot while at least another one of the plurality of the different file directory tree structure portions of the selected storage snapshot is being analyzed in parallel, wherein traversing and comparing the corresponding file directory tree structure portion of the selected storage snapshot with the corresponding portion of the file directory tree structure of the previous storage snapshot at least includes:
a first directory walker associated with the selected storage snapshot traversing a corresponding assigned portion of the file directory tree structure associated with the selected storage snapshot based on a directory tuple of the first directory walker associated with the selected storage snapshot,
a second directory walker associated with the previous storage snapshot traversing a corresponding assigned portion of the file directory tree structure associated with the previous storage snapshot based on the directory tuple associated with the second directory walker associated with the selected storage snapshot, wherein the directory tuple of the first directory walker associated with the selected storage snapshot is the same as the directory tuple of the second directory walker associated with the previous storage snapshot, and a differ identifying one or more changes that includes one or more additions and/or one or more removals of file directory tree structure nodes between the corresponding assigned portion of the file directory tree structure associated with the selected storage snapshot and the corresponding assigned portion of the file directory structure associated with the previous storage snapshot based on a comparison of a traversal of the first directory walker with a traversal of the second directory walker; and performing an incremental backup of the file directory tree structure of the primary system in part by:
  requesting, by the storage system, data associated with the identified changes,
  receiving from the primary system and storing by the storage system the requested data associated with the identified changes, and
  generating, by the storage system, a backup version of the file directory tree structure of the selected storage snapshot based on the requested data.

2. The method of claim 1, further comprising traversing at least a portion of the file directory tree structure of the selected storage snapshot in a determined order.

3. The method of claim 2, wherein the determined order is a preorder traversal with a lexicographical order of children nodes.

4. The method of claim 1, wherein dynamically dividing the file directory tree structure of the selected storage snapshot into the different portions further comprises assigning a corresponding directory differ to each of the different portions.

5. The method of claim 4, wherein the corresponding directory differ is associated with a first corresponding directory walker and a second corresponding directory walker.

6. The method of claim 5, wherein the first corresponding directory walker is configured to traverse the corresponding portion of the file directory tree structure of the selected storage snapshot and the second corresponding directory walker is configured to traverse the corresponding portion of the file directory tree structure of the previous storage snapshot.

7. The method of claim 1, wherein the directory tuple at least indicates a root node associated with the first directory walker and the second directory walker, a starting node associated with the first directory walker and the second directory walker, and an ending node associated with the first directory walker and the second directory walker.

8. The method of claim 4, wherein the corresponding directory differ is configured to maintain a data structure that associates the first directory walker and the second directory walker with the directory tuple.

9. The method of claim 5, wherein the first corresponding directory walker and the second corresponding directory walker are configured to provide checkpoint information to the corresponding directory differ and the corresponding directory differ is configured to update a checkpoint data store based on the checkpoint information.

10. The method of claim 9, wherein the corresponding directory differ is configured to identify one or more differences associated with the corresponding portion of the file directory tree structure of the selected storage snapshot and the corresponding portion of the file directory tree structure of the previous storage snapshot based on the checkpoint information included in the checkpoint data store.

11. The method of claim 9, wherein a traversal of the corresponding portion of the file directory tree structure of the selected storage snapshot and the corresponding portion of the file directory tree structure of the previous storage snapshot is resumed from a location based on the checkpoint data store.

12. The method of claim 9, wherein a primary directory differ is configured to generate one or more consolidated checkpoint data stores based on corresponding checkpoint data stores received from the plurality of directory differs, wherein the one or more consolidated checkpoint data stores are used to perform a subsequent incremental backup of the file directory tree structure.

13. The method of claim 12, wherein the subsequent incremental backup of the file directory tree structure is divided based on the one or more consolidated checkpoint data stores.

14. The method of claim 12, wherein performing the subsequent incremental backup of the file directory tree structure includes comparing node information included in the one or more consolidated checkpoint data stores to node information determined from a traversal of a subsequent version of the file directory tree structure.

15. The method of claim 1, wherein dynamically dividing the file directory tree structure of the selected storage snapshot into the different portions at least includes:
  determining a root node of the file directory tree structure of the selected storage snapshot;
  determining a level of the file directory tree structure of the selected storage snapshot below the root node of the file directory tree structure of the selected storage snapshot; and
  determining a plurality of nodes associated with the level of the file directory tree structure of the selected storage snapshot.

16. A non-transitory computer readable storage medium and comprising computer instructions for:
  remotely accessing a selected storage snapshot that is stored on a primary system;
  dynamically dividing, by a storage system, a file directory tree structure of the selected storage snapshot into different portions, wherein a corresponding walker is assigned to each of the different portions;
  analyzing, by the storage system, a plurality of the different file directory tree structure portions in parallel to identify any changes of the selected storage snapshot from a previous storage snapshot, wherein analyzing each of the plurality of the different file directory tree structure portions includes traversing and comparing a corresponding file directory tree structure portion of the selected storage snapshot with a corresponding portion of a file directory tree structure of the previous storage snapshot while at least another one of the plurality of the different file directory tree structure portions of the selected storage snapshot is being analyzed in parallel, wherein traversing and comparing the corresponding file directory tree structure portion of the selected storage snapshot with the corresponding portion of the file directory tree structure of the previous storage snapshot at least includes:
    a first directory walker associated with the selected storage snapshot traversing a corresponding assigned portion of the file directory tree structure associated with the selected storage snapshot based on a directory tuple of the first directory walker associated with the selected storage snapshot,
    a second directory walker associated with the previous storage snapshot traversing a corresponding assigned portion of the file directory tree structure associated with the previous storage snapshot based on the directory tuple associated with the second directory walker associated with the selected storage snapshot, wherein the directory tuple of the first directory walker associated with the selected storage snapshot is the same as the directory tuple of the second directory walker associated with the previous storage snapshot, and a differ identifying one or more changes that includes one or more additions and/or one or more removals of file directory tree structure nodes between the corresponding assigned portion of the file directory tree structure associated with the selected storage snapshot and the corresponding assigned portion of the file directory structure associated with the previous storage snapshot based on a comparison of a traversal of the first directory walker with a traversal of the second directory walker; and performing an incremental backup of the file directory tree structure of the primary system in part by:

requesting, by the storage system, data associated with the identified changes, receiving from the primary system and storing by the storage system the requested data, and generating by the storage system a backup version of the file directory tree structure of the selected storage snapshot based on the requested data.

17. A system, comprising:

a hardware processor configured to:

remotely access a selected storage snapshot that is stored on a primary system;

dynamically divide a file directory tree structure of a selected storage snapshot into different portions, wherein a corresponding walker is assigned to each of the different portions;

analyze a plurality of the different file directory tree structure portions in parallel to identify any changes of the selected storage snapshot from a previous storage snapshot, wherein to analyze each of the plurality of the different file directory tree structure portions, the processor is further configured to traverse and compare a corresponding file directory tree structure portion of the selected storage snapshot with a corresponding portion of a file directory tree structure of the previous storage snapshot while at least another one of the plurality of the different file directory tree structure portions of the selected storage snapshot is being analyzed in parallel, wherein to traverse and compare the corresponding file directory tree structure portion of the selected storage snapshot with the corresponding portion of the file directory tree structure of the previous storage snapshot, the hardware processor at least utilizes:

a first directory walker associated with the selected storage snapshot to traverse a corresponding assigned portion of the file directory tree structure associated with the selected storage snapshot based on a directory tuple of the first walker directory associated with the selected storage snapshot, a second directory walker associated with the previous storage snapshot to traverse a corresponding assigned portion of the file directory tree structure associated with the previous storage snapshot based on the directory tuple associated with the second directory walker associated with the selected storage snapshot, wherein the directory tuple of the first directory walker associated with the selected storage snapshot is the same as the directory tuple of the second walker directory associated with the previous storage snapshot, and a differ to identify one or more changes that includes one or more additions and/or one or more removals of file directory tree structure nodes between the corresponding assigned portion of the file directory tree structure associated with the selected storage snapshot and the corresponding assigned portion of the file directory structure associated with the previous storage snapshot based on a comparison of a traversal of the first directory walker with a traversal of the second directory walker; and perform an incremental backup of the file directory tree structure of the primary system in part by:

requesting data associated with the identified changes, receiving and storing the requested data, and generating a backup version of the file directory tree structure of the selected storage snapshot based on the requested data; and a memory coupled to the hardware processor and configured to provide the hardware processor with instructions.

* * * * *